US012372911B2

(12) United States Patent
Tohkaishi et al.

(10) Patent No.: US 12,372,911 B2
(45) Date of Patent: Jul. 29, 2025

(54) ENCLOSING DEVICE, ENCLOSING-SEALING APPARATUS, AND IMAGE FORMING SYSTEM

(71) Applicants: Shuuto Tohkaishi, Kanagawa (JP); Ryota Takayama, Kanagawa (JP); Kanako Fujisaki, Kanagawa (JP)

(72) Inventors: Shuuto Tohkaishi, Kanagawa (JP); Ryota Takayama, Kanagawa (JP); Kanako Fujisaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 18/360,865

(22) Filed: Jul. 28, 2023

(65) Prior Publication Data

US 2024/0045363 A1 Feb. 8, 2024

(30) Foreign Application Priority Data

Aug. 2, 2022 (JP) ................................ 2022-123495

(51) Int. Cl.
*G03G 15/00* (2006.01)
*B43M 5/04* (2006.01)

(52) U.S. Cl.
CPC ......... *G03G 15/6582* (2013.01); *B43M 5/042* (2013.01); *G03G 2215/00514* (2013.01); *G03G 2215/00877* (2013.01)

(58) Field of Classification Search
CPC ......... B43M 5/042; G03G 2215/00514; G03G 2215/00877; G03G 15/6582
See application file for complete search history.

(56) References Cited

U.S. PATENT DOCUMENTS

| | | | | |
|---|---|---|---|---|
| 5,406,771 A * | 4/1995 | Dronsfield | B43M 3/045 53/284.3 |
| 5,819,666 A * | 10/1998 | Ishikawa | B43M 5/042 270/1.03 |
| 2011/0220557 A1* | 9/2011 | Sasaki | G03G 15/6594 209/645 |
| 2012/0131885 A1* | 5/2012 | Matsushita | B43M 3/045 53/235 |
| 2020/0087097 A1* | 3/2020 | Iwata | B65H 31/34 |
| 2022/0380168 A1* | 12/2022 | Shibasaki | B65H 45/04 |

FOREIGN PATENT DOCUMENTS

| | | | |
|---|---|---|---|
| JP | H07261626 | A | 10/1995 |
| JP | 2006-103815 | A | 4/2006 |
| JP | 2011-112972 | A | 6/2011 |
| JP | 2015-040093 | A | 3/2015 |

* cited by examiner

*Primary Examiner* — Andrew M Tecco
*Assistant Examiner* — Nicholas E Igbokwe
(74) *Attorney, Agent, or Firm* — Harness, Dickey & Pierce, P.L.C.

(57) ABSTRACT

An enclosing device includes an envelope conveyance path, an envelope loader, an envelope-position restrictor, and an envelope-position adjuster. The envelope conveyance path conveys an envelope to an enclosing position at which an enclosure is enclosed into the envelope. The envelope loader loads the envelope to be supplied to the envelope conveyance path. The envelope-position restrictor restricts a loaded position of the envelope in the envelope loader. The envelope-position adjuster adjusts a position of the envelope with respect to a conveyance direction of the envelope while maintaining a state in which the envelope-position restrictor restricts the loaded position of the envelope.

18 Claims, 24 Drawing Sheets

ENCLOSING DEVICE, ENCLOSING-SEALING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2022-123495, filed on Aug. 2, 2022, in the Japan Patent Office, the entire disclosure of which is hereby incorporated by reference herein.

BACKGROUND

Technical Field

Embodiments of the present disclosure relate to an enclosing device, an enclosing-sealing apparatus, and an image forming system.

Related Art

There are known an enclosing device that encloses an enclosure in an envelope and an enclosing-sealing apparatus that seals an envelope in which an enclosure is enclosed. There is also known an image forming system in which an image forming apparatus that forms an image on a sheet medium, a folding processing apparatus that performs folding processing on the sheet medium, an enclosing device, and an enclosing-sealing apparatus cooperate with each other to enclose and seal the folded sheet medium, on which the image is formed, in an envelope.

The enclosing device has a function of taking out an envelope from a supply tray on which envelopes are loaded and conveying the envelope toward a predetermined position where enclosing processing is performed. If the loaded position of the envelope deviates from an appropriate position with respect to a conveyance path when the envelope is conveyed to the predetermined position, a conveyance failure is caused. For this reason, when an envelope is placed on the supply tray, it is necessary to adjust the placement position of the envelope such that the envelope be placed at the appropriate position with respect to the conveyance path, to prevent the positional deviation.

The term "positional deviation" of the envelope with respect to the conveyance path typically indicates a deviation in a direction orthogonal to the conveyance direction of the envelope. Such positional deviation may be referred to as "lateral deviation" or "lateral registration".

In an image forming apparatus having a function of conveying a sheet to a predetermined position in order to form an image on the sheet as an object to be conveyed, a configuration is disclosed in which lateral registration of the sheet placed on a supply tray is corrected, although the object to be conveyed is not assumed to be an envelope. In such a configuration, the correction of lateral registration is performed when a supply tray on which sheets are loaded is installed to an apparatus. As a result, the lateral registration of sheets is not corrected after the supply tray is installed in the apparatus.

SUMMARY

According to an embodiment of the present disclosure, an enclosing device includes an envelope conveyance path, an envelope loader, an envelope-position restrictor, and an envelope-position adjuster. The envelope conveyance path conveys an envelope to an enclosing position at which an enclosure is enclosed into the envelope. The envelope loader loads the envelope to be supplied to the envelope conveyance path. The envelope-position restrictor restricts a loaded position of the envelope in the envelope loader. The envelope-position adjuster adjusts a position of the envelope with respect to a conveyance direction of the envelope while maintaining a state in which the envelope-position restrictor restricts the loaded position of the envelope.

According to another embodiment of the present disclosure, an enclosing-sealing apparatus includes the enclosing device and a sealer to seal the envelope, in which the enclosure is enclosed, in the envelope conveyance path.

According to still another embodiment of the present disclosure, an image forming system includes: an image forming apparatus to form an image on a sheet medium; a folding processing apparatus to fold the sheet medium on which the image is formed; and the enclosing-sealing apparatus, to enclose the sheet medium, which is conveyed from the image forming apparatus or the folding processing apparatus, into the envelope and seal the envelope.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
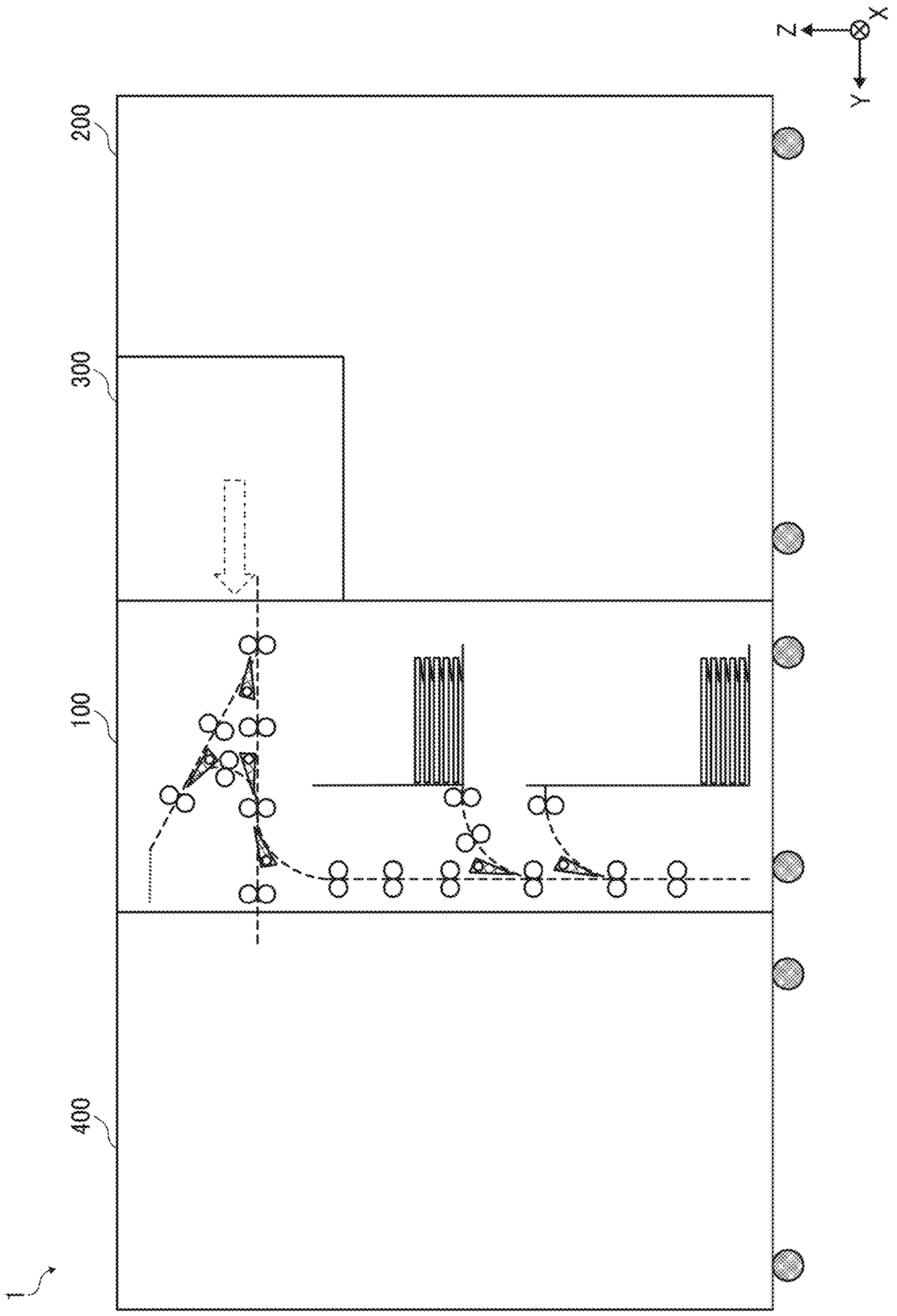
FIG. 1 is an external front view of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Hereinafter, an embodiment of the present disclosure applied to a color laser printer (hereinafter, simply referred to as a printer) that is an image forming apparatus will be described.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiment of Image Forming System

First, a description is given of an image forming system according to an embodiment of the present disclosure. FIG. 1 is a front external view of a print system 1 serving as an image forming system according to an embodiment of the present disclosure. The print system 1 includes an image forming apparatus 200, a folding processing apparatus 300 serving as a sheet processing apparatus, an enclosing-sealing processing apparatus 100 serving as an enclosing apparatus or an enclosing-sealing apparatus according to an embodiment of the present disclosure, and a post-processing apparatus 400.

The image forming apparatus 200 is an example of an apparatus that performs image forming processing by a predetermined method on a sheet medium and ejects the medium, on which an image is formed, in a downstream direction. In the following description of the present embodiment, a sheet medium conveyed from the image forming apparatus 200 to the enclosing-sealing processing apparatus 100 is simply referred to as "sheet S".

The folding processing apparatus 300 performs predetermined folding processing on a sheet S ejected from the image forming apparatus 200. As illustrated in FIG. 1, the folding processing apparatus 300 may be installed in a state of being incorporated in a part of a housing of the image forming apparatus 200, or may be arranged next to the image forming apparatus 200 in a housing separate from the image forming apparatus 200. In the present embodiment, the sheet S ejected from the image forming apparatus 200 and subjected to the folding processing in the folding processing apparatus 300 is referred to as "folded sheet Sf".

The instruction of "execution" or "non-execution" of the folding processing on the sheet S is an instruction sent from a controller of the image forming apparatus 200 based on information input to the controller by the user of the print system 1. Alternatively, the above-described instruction may be based on information input by the user of the print system 1 to the controller included in the folding processing apparatus 300.

As a result, the sheet S ejected from the image forming apparatus 200 may be conveyed to the enclosing-sealing processing apparatus 100 as it is. Alternatively, the folded sheet Sf ejected from the folding processing apparatus 300 may be conveyed to the enclosing-sealing processing apparatus 100.

The post-processing apparatus 400 is an apparatus that performs predetermined post-processing (e.g., stapling processing or punching processing) instructed via the controller on the sheet S or the folded sheet Sf ejected from the apparatus on the upstream side (the image forming apparatus 200, the folding processing apparatus 300, or the enclosing-sealing processing apparatus 100).

The enclosing-sealing processing apparatus 100 executes enclosing-and-sealing processing including an enclosing operation (enclosing processing) of inserting (enclosing) the sheet S or the folded sheet Sf as an "enclosure" into an envelope E and a sealing operation (sealing processing) of closing the lid (e.g., flap ef) of the enclosed envelope E and ejecting the envelope.

In order to insert the enclosure (sheet S or folded sheet Sf) in an appropriate orientation with respect to the envelope E, the enclosing-sealing processing apparatus 100 includes an enclosure reversing conveyor that reverses the orientation of ends of the enclosure in the conveyance direction. In other words, the enclosing-sealing processing apparatus 100 has a function of determining whether the formation position of, for example, the address formed on the enclosure matches a transparent window ew formed in advance on the envelope E, and executing the reverse conveying processing of reversing ends of the enclosure in the conveyance direction based on the determination result. The enclosing-sealing processing apparatus 100 includes a conveying mechanism that, when the reversing operation is to be performed, reverses the enclosure through a conveyance path upstream from an enclosing position and conveys the enclosure to the enclosing position.

The enclosing-sealing processing apparatus 100 also has a function of performing sealing processing of sealing and ejecting the envelope E into which the enclosure is inserted. The enclosing-sealing processing apparatus 100 can also execute a conveying operation (conveying processing) of ejecting, for example, a sheet S to an apparatus (post-processing apparatus 400) arranged on the downstream side without performing the enclosing processing in the enclosing-sealing processing apparatus 100.

The operation control of the enclosing processing, the sealing processing, and the conveying processing of causing the sheet S to pass without executing the enclosing processing and the sealing processing in the enclosing-sealing processing apparatus 100 is based on instruction information input to the controller by the user of the printing system 1.

The instruction information in this case may be based on information input to a controller included in the image forming apparatus 200 or the folding processing apparatus 300 via an input interface. The instruction information may also be based on information input by the user of the print system 1 to the controller (the enclosing-and-sealing controller 190) included in the enclosing-sealing processing apparatus 100.

The "coordinate axis" used for describing the "direction" in the present embodiment is described below. As illustrated in FIG. 1, the printing system 1 has a configuration in which multiple apparatuses are installed on an installation plane at the same level and sequentially arranged in a certain direction. The axis extending in a direction in which the apparatuses are arranged and parallel to the installation plane of the apparatuses is referred to as Y axis. The starting point of the Y-axis is an end of the image forming apparatus 200, and the direction of arrow indicated by the Y-axis from the image forming apparatus 200 is referred to as +Y direction. The opposite direction in which the apparatuses are arranged is referred to as −Y direction. As a result, the medium (sheet S) ejected from the image forming apparatus 200 is ejected in the +Y direction. In other words, the conveyance direction of the sheet S is the +Y direction.

Similarly, the axis parallel to the installation plane of the printing system 1 and orthogonal to the Y axis is defined as X axis. The X axis is also an axis extending in the depth direction of the printing system 1. A depth direction which is a direction of arrow indicating the X axis is referred to as +X direction, and a front direction which is opposite to the depth direction is referred to as −X direction.

Z-axis defines an axis that is perpendicular to the X-axis and the Y-axis and extends in a height direction of the printing system 1. A direction of arrow indicating the Z axis is referred to as +Z direction and a direction opposite to the +Z direction is referred to as "−Z direction".

In the drawings used in the following description, when the same coordinate axes as those described above are added, the definitions of directions in the following description are the same as those described above.

A sheet S, on which an image is formed in the image forming apparatus 200, is ejected in the +Y direction and then conveyed to the apparatuses disposed downstream from the image forming apparatus 200. Accordingly, the +Y direction is substantially the same as the conveyance direction of the sheet S. Therefore, when image forming processing is performed on the sheet S ejected downstream (in the +Y direction) from the image forming apparatus 200, the conveyance direction of the sheet S corresponds to "sub-scanning direction". A direction orthogonal to the conveyance direction of the sheet S corresponds to "main scanning direction". In the present embodiment, the main scanning direction corresponds to the same direction as the direction corresponding to the lateral width of the conveyance path.

As will be described later, in the enclosing-sealing processing apparatus 100, the direction in which an enclosure is conveyed for entry is substantially the +Y direction. However, in the conveyance control of conveying the enclosure to the enclosing position where the enclosure is enclosed in the envelope E, the conveyance direction is switched to the Z direction. In the conveyance control of conveying the envelope E to the enclosing position, the envelope E is conveyed in the +Y direction from the loaded position, is then reciprocated in the Z direction, and is then conveyed in the −Y direction to be ejected.

Summarizing the above description, in the enclosing-sealing processing apparatus 100 of the printing system 1, the enclosure (folded sheet Sf) conveyed in the +Y direction at the time of entry is then conveyed in the −Z direction and enclosed into the envelope E. On the other hand, the envelope E stored in the enclosing-sealing processing apparatus 100 is separated from the loaded position and conveyed in the +Y direction. Then, the envelope E is conveyed in the +Z direction to reach the enclosing position. After the enclosing operation is performed on the envelope E, the envelope E is conveyed in the −Z direction, is subjected to the sealing processing, and then is ejected in the −Y direction.

In addition, in the cases of the sheet S and the folded sheet Sf which are not to be subjected to the enclosing processing, the sheet S and the folded sheet Sf only pass through the enclosing-sealing processing apparatus 100. As a result, the sheet S and the folded sheet Sf are only conveyed in the +Y direction in the same manner as when the sheet S and the folded sheet Sf are conveyed into the enclosing-sealing processing apparatus 100.

Functional Blocks of Print System 1

Figure 2:
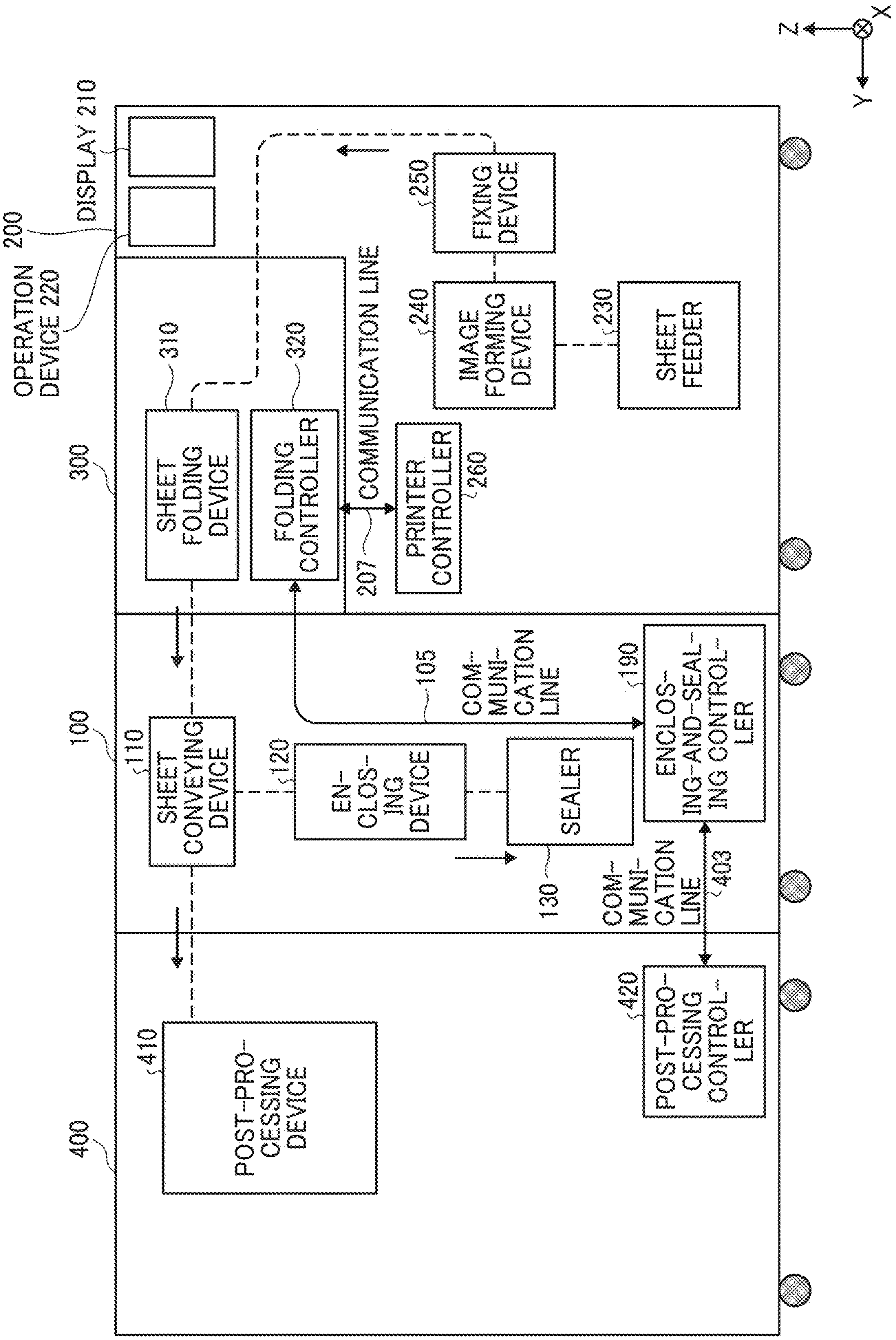
FIG. 2 is a block diagram illustrating a control configuration of the image forming system of FIG. 1.

Referring to FIG. 2, a description is given of functional blocks of the printing system 1, according to an embodiment of the present disclosure. In the following description, it is assumed that the enclosure is a folded sheet Sf. In FIG. 2, a moving path (conveyance path) of the folded sheet Sf is indicated by a broken line. Solid lines indicate communication paths used for transmission and reception of signals between the functional blocks. The moving path (conveyance path) in a case where the enclosure is a sheet S is the same as the moving path indicated by the broken line.

The image forming apparatus 200 is, for example, an apparatus that forms an image on a sheet S by an electrophotographic process. The image forming apparatus 200 includes a display 210, an operation device 220, a sheet feeder 230, an image forming device 240, a fixing device 250, and a printer controller 260.

The display 210 displays screens for notifying a user of states of various functions and operation contents. The operation device 220 corresponds to an operation interface with which a user performs a setting operation of a processing operation mode or the number of prints to be processed, and a setting operation of a setting that requires reverse processing when enclosing processing is performed in the enclosing-sealing processing apparatus 100. The sheet feeder 230 includes a sheet feeding mechanism that stores sheets S and separates and feeds the sheets S one by one. The image forming device 240 forms a latent image on a photoconductor and transfers an image onto the sheet S. The fixing device 250 fixes the image transferred on the sheet S. The printer controller 260 controls operations of the above-described functional blocks.

The folding processing apparatus 300 includes a sheet folding device 310 and a folding controller 320. The sheet folding device 310 performs folding processing on the sheet S conveyed from the image forming apparatus 200 in a folding type (folding method) designated by the printer controller 260 of the image forming apparatus 200 via a communication line 207. The folding controller 320 controls the sheet folding device 310 and the entire folding processing apparatus 300. The folding controller 320 also controls communication with the printer controller 260. The folding controller 320 further controls communication with the enclosing-and-sealing controller 190 connected downstream from the folding controller 320. The sheet S may be conveyed to the enclosing-sealing processing apparatus 100 without being folded in the sheet folding device 310.

A plurality of types of structures of the sheet folding device 310 are conceivable. Due to the difference in structure, the orientation of the folded sheet Sf after the folding processing with respect to the conveyance direction and the position of the surface of the folded sheet Sf after the folding processing are different. In other words, at the "predetermined position" of the enclosing device 120 to be described later, an end of the folded sheet Sf corresponding to the leading end in the enclosing direction when the folded sheet Sf is enclosed in the envelope E differs depending on the type of the folding processing. Even in the same folding processing, the leading end of the folded sheet Sf in the conveyance direction may be replaced with the other end, depending on the internal configuration of the sheet folding device 310. For this reason, as will be described later, in the enclosing-sealing processing apparatus 100, a conveying operation and a reverse conveying operation are performed in the sheet conveying device 110 such that the folded sheet Sf is oriented in a predetermined direction at when the folded sheet Sf is enclosed.

Examples of Different Folding Operation in Sheet Folding Device 310

As examples of different types of configurations, a sheet folding device 310 according to an embodiment of the present disclosure is illustrated in FIGS. 23A to 23E and a sheet folding device 310 according to another embodiment of the present disclosure is illustrated in FIGS. 24A to 24E. There are a plurality of types of configurations of the sheet folding device 310. Depending on the configuration, the orientation of an image forming surface Ps in the folded sheet Sf at the time of being ejected may be different even if the folding type is the same. In the following description, the sheet folding device 310 illustrated in FIGS. 23A to 23E may be referred to as "type A", and the sheet folding device 310 illustrated in FIGS. 24A to 24E may be referred to as "type B". In, for example, FIGS. 23A and 24A, the printing surface (image forming surface Ps) of the sheet S on which an image is formed is marked with triangles. In the following description, it is assumed that an image is not formed on one surface of the sheet S.

As illustrated in FIGS. 23A to 23E, a lower surface of the sheet S in the conveyance direction of the sheet S conveyed from the image forming apparatus 200 to the sheet folding device 310 corresponds to the image forming surface Ps.

Figure 23A:
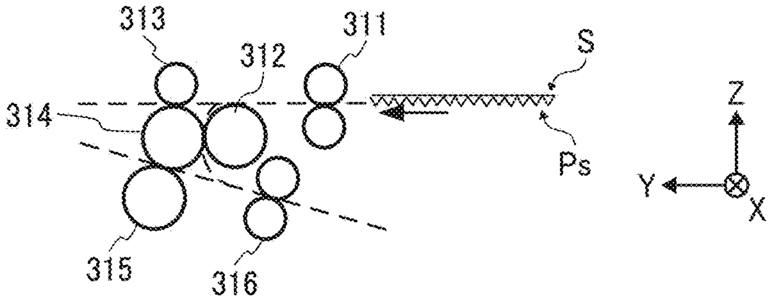
FIGS. 23A to 23E are diagrams illustrating the relation between a resultant sheet of folding processing in a folding processing apparatus, which operates in conjunction with the enclosing-sealing processing apparatus, and sealing processing, according to an embodiment of the present disclosure.

First, as illustrated in FIG. 23A, the sheet S is conveyed from the image forming apparatus 200 toward a conveying roller pair 311.

Figure 23B:
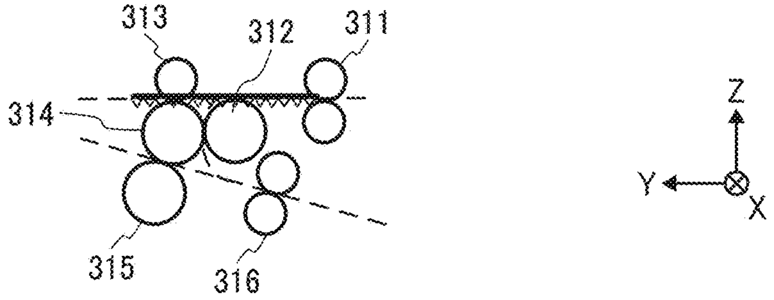

As illustrated in FIG. 23B, the sheet S conveyed downstream by the conveying roller pair 311 is conveyed to a predetermined position by a first folding roller 312, a first folding conveying roller 313, and a second folding roller 314.

Figure 23C:
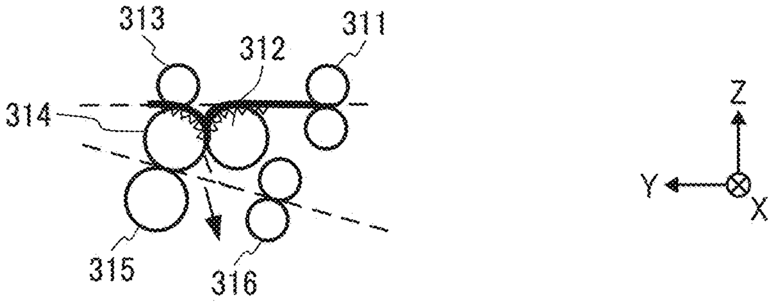

Subsequently, as illustrated in FIG. 23C, the first folding conveying roller 313 and the second folding roller 314 are rotated in reverse to form a first crease on the sheet S.

Figure 23D:
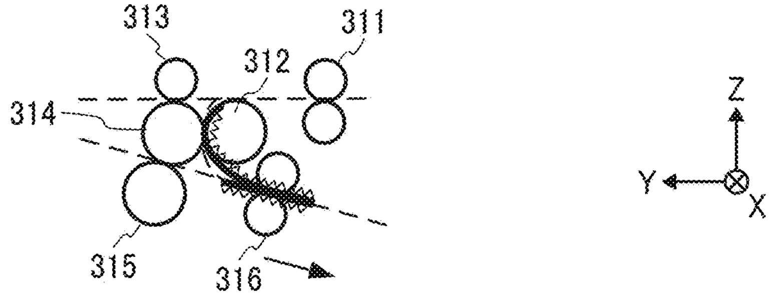

As illustrated in FIG. 23D, the sheet S on which the first crease is formed is conveyed by the first folding roller 312, the second folding roller 314, and a second folding conveying roller pair 316 to a path different from a path through which the sheet S enters, and is stopped at a predetermined position.

Figure 23E:
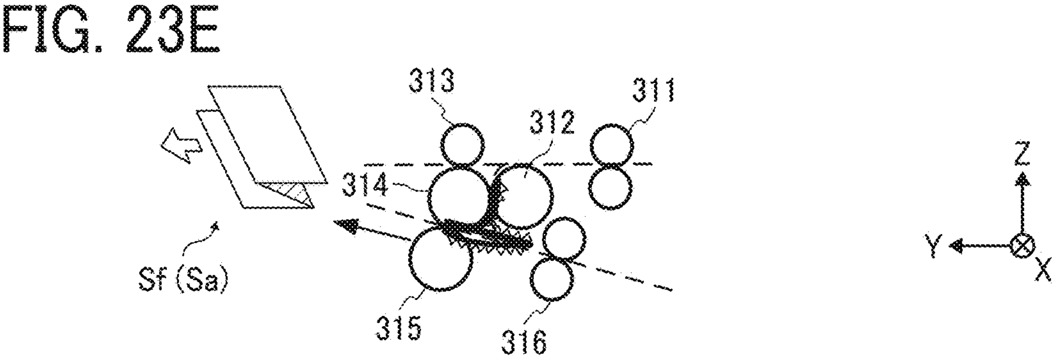

Subsequently, as illustrated in FIG. 23E, the second folding conveying roller pair 316 is rotated in reverse, and a third folding roller 315 is also rotated to convey the sheet S in a downstream direction. Then, a second crease is formed on the sheet S. Thus, the folded sheet Sf of outer three-folding or 6-page accordion is completed. In this case, the image forming surface Ps of the folded sheet Sf is at the position of a surface (lower surface) which faces a lower side in the direction orthogonal to the conveyance direction.

A description is given of the sheet folding device 310 of type B. As illustrated in FIGS. 24A to 24E, the sheet folding device 310 of type B performs folding processing on a sheet S while the sheet S from the image forming apparatus 200 is conveyed in the −Z direction. The image forming surface Ps of the sheet S entering the sheet folding device 310 faces, for example, the +Y direction.

Figure 24A:
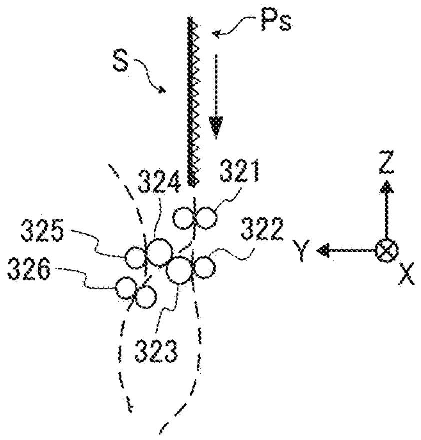
FIGS. 24A to 24E are diagrams each illustrating the relation between a resultant sheet of post-processing in a post-processing apparatus, which operates in conjunction with the enclosing-sealing processing apparatus, and sealing processing, according to an embodiment of the present disclosure.

First, as illustrated in FIG. 24A, the sheet S is conveyed from the image forming apparatus 200 toward a first conveying roller pair 321.

Figure 24B:
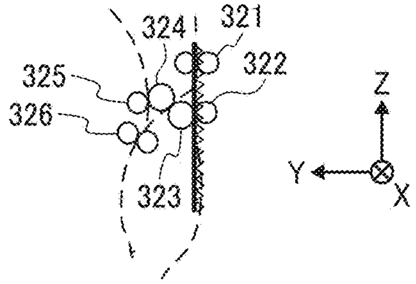

Subsequently, as illustrated in FIG. 24B, the sheet S is conveyed downward to a predetermined position by the first conveying roller pair 321, a first folding roller 323, and a first folding conveying roller 322, and then stops.

Figure 24C:
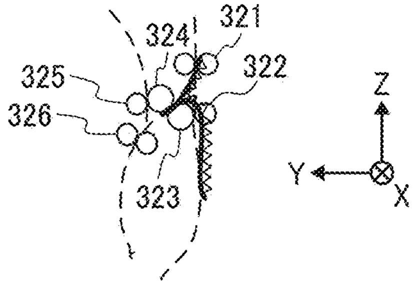

Then, as illustrated in FIG. 24C, the first folding conveying roller 322 and the first folding roller 323 are rotated in reverse, and a second folding roller 324 is rotated to form the first crease.

Figure 24D:
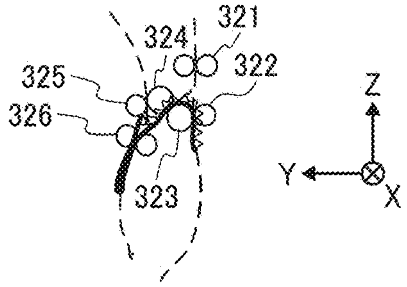

Further, as illustrated in FIG. 24D, a second conveying roller pair 326 is also rotated to convey and stop the sheet S at a predetermined position.

Figure 24E:
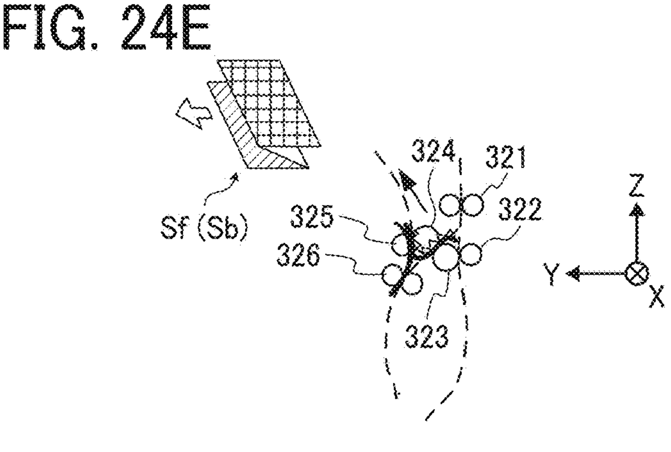

Then, as illustrated in FIG. 24E, the second conveying roller pair 326 is rotated in reverse. The folded sheet Sf is conveyed upward by the rotation of a second folding conveying roller 325. The second folding roller 324 and the second folding conveying roller 325 form a second crease. Thus, the folded sheet Sf of outer three-folding or 6-page accordion is completed. In this case, unlike the type A, the image forming surface Ps of the folded sheet Sf is at the position of a surface (upper surface) that faces an upper side in the direction orthogonal to the conveyance direction. As described above, even when the same outer three-folding is performed by the sheet folding devices 310 of different types such as the type A and the type B, the position (direction) of the print surface (image forming surface) with respect to the conveyance direction is different. In other words, depending on the type of the sheet folding device 310, the surface on which address or other information is printed may be on the lower side or the upper side when the sheet is conveyed into the enclosing-sealing processing apparatus 100. For this reason, as will be described later, the enclosing-sealing processing apparatus 100 according to the present embodiment performs control, based on information indicating the type of the sheet folding device 310, such that the folded sheet Sf is reversed during conveyance and the position (orientation) of the image forming surface Ps is unified in a certain direction to reach the enclosing operation.

Functional Blocks of Enclosing-Sealing Processing Apparatus 100

Returning to FIG. 2, a description is given below. The enclosing-sealing processing apparatus 100 includes a sheet conveying device 110, an enclosing device 120, a sealer 130, and an enclosing-and-sealing controller 190.

The sheet conveying device 110 performs predetermined processing on the folded sheet Sf conveyed from the sheet folding device 310. In the present embodiment, the "predetermined processing" refers to control processing including conveying processing according to a control mode transmitted from the printer controller 260 or the folding controller 320 to the enclosing-and-sealing controller 190 via the communication line 105. Examples of the control mode include an "enclosing mode" in which the conveyed sheet S or the folded sheet Sf is handled as an enclosure, and a "conveying mode" in which the sheet S or the folded sheet Sf is ejected to the post-processing apparatus 400 without being handled as an enclosure. In addition to the control mode, conveying processing is also executed based on information indicating, for example, the type of folding and the position of the print surface as information relating to the enclosure.

The conveying processing executed by the sheet conveying device 110 includes a conveying operation of conveying the folded sheet Sf downstream in the conveyance direction for the enclosing processing, in addition to the conveying operation of ejecting the conveyed sheet Sf downstream as it is as in the conveying mode. In addition, the conveying processing includes reverse conveying processing in which ends of the folded sheet Sf in the conveyance direction are reversed. The folded sheet Sf is conveyed to the enclosing device 120 or the post-processing apparatus 400 by the conveyance processing and the reversal conveyance processing.

The enclosing device 120 conveys the folded sheet Sf, which is conveyed from the sheet conveying device 110, toward the envelope E having been moved to the enclosing position. A conveying operation for causing the folded sheet Sf to enter the envelope E at the enclosing position is also performed. The enclosing device 120 also performs processing of conveying the envelope E to the enclosing position and causing the envelope E to stand by. The enclosing device 120 includes an enclosure pusher 160 that pushes the enclosure into the waiting envelope E to enclose the enclosure.

The enclosing device 120 also includes a flap opening mechanism that opens the flap ef of the envelope E on the conveyance path before the envelope E reaches the enclosing position so that the opening of the envelope E is in an open state.

The sealer 130 performs processing of ejecting the sealed envelope E to an envelope ejection tray 134 after the flap ef of the envelope E in which the folded sheet Sf has been enclosed is closed.

The enclosing-and-sealing controller 190 controls operations of a plurality of conveying roller pairs for conveying the sheet S, the folded sheet Sf, and the envelope E and an operation of a switching plate to switch the sheet S, the folded sheet Sf, and the envelope E in the sheet conveying device 110, the enclosing device 120, and the sealer 130. In other words, the enclosing-and-sealing controller 190 controls the conveying operation performed in the enclosing-sealing processing apparatus 100, and controls the conveyance direction and the conveying operation of the sheet S, the folded sheet Sf, and the envelope E.

In the following description, the driving source of the switching plate on the conveyance path is not limited to any particular type of driving source. For example, a motor or a solenoid can be appropriately used as the driving source of the switching plate. The enclosing-sealing processing apparatus 100 has a drive control configuration that can control, in the enclosing-and-sealing controller 190, the operation of the motor or the solenoid to rotate in a predetermined direction at a predetermined timing, to switch the state of enclosing-sealing processing apparatus 100 to a state suitable for a designated conveying operation.

The enclosing-and-sealing controller 190 also performs control related to operations of the enclosure pusher 160 and the flap opening mechanism included in the enclosing device 120. The enclosing-and-sealing controller 190 also controls operations including the sealing operation in the sealer 130.

The enclosing-and-sealing controller 190 as a controller receives "enclosing target information" as information related to the folded sheet Sf from the printer controller 260 and the folding controller 320, and performs control based on the enclosing target information.

The term "enclosing target information" is information related to the sheet S or the folded sheet Sf as enclosures to be enclosed. Examples of the enclosing target information include information indicating whether an enclosing operation is to be performed in the job (whether the job is an envelope job) or whether an enclosing operation is not to be performed in the job (whether the job is a print job) and, in the case of the envelope job, information indicating the leading end of the sheet S or the folded sheet Sf or the position of the image forming surface Ps when the sheet S or the folded sheet Sf is enclosed in the envelope E. Examples of the enclosing target information include "folding type information" that defines the type of folding processing performed on the folded sheet Sf. Examples of operation instruction information from the image forming apparatus 200, which is one of upstream apparatuses, include "reversal necessity information" which defines necessity of the reversal conveyance processing described below. Examples of the operation instruction information further include "processing device information" indicating the type of the sheet folding device 310 that has performed the folding processing.

The post-processing apparatus 400 includes a post-processing device 410 and a post-processing controller 420. The post-processing device 410 executes predetermined post-processing on the sheet S conveyed from the upstream side under the control of the post-processing controller 420. The post-processing controller 420 controls the post-processing operation in the post-processing controller 420 according to the operation mode transmitted from the printer controller

260, the folding controller 320, and the enclosing-and-sealing controller 190 through a communication line 403.

The printer controller 260, the folding controller 320, the enclosing-and-sealing controller 190, and the post-processing controller 420 are connected to each other, and exchange information necessary for control through the communication lines 207, 105, and 403. Accordingly, the printer controller 260, the folding controller 320, the enclosing-and-sealing controller 190, and the post-processing controller 420 cooperate with each other to share the sheet size and information about the processing mode requested by a user to be performed on the sheet S and the folded sheet Sf. As a result, the entirety of the print system 1 shares control information that allows each of the mechanisms described above to perform predetermined processing with predetermined timing and a predetermined process.

The enclosing-and-sealing controller 190 that performs a central control operation in the present embodiment includes a central processing unit (CPU) as an arithmetic processing unit, and a read only memory (ROM) and a random-access memory (RAM) as storage devices. The enclosing-and-sealing controller 190 includes, for example, an interface that outputs control signals to conveying roller pairs and inputs signals from the conveying roller pairs, and an interface that receives output signals from sensors. The operation of the enclosing-sealing processing apparatus 100 is controlled by control programs that can execute control processing using the above-described hardware resources.

Similarly to the enclosing-and-sealing controller 190, the printer controller 260, the folding controller 320, and the post-processing controller 420 also cooperate hardware resources such as a CPU, a ROM, and a RAM with control programs for implementing the functions of the printer controller 260, the folding controller 320, and the post-processing controller 420, to control the operations of hardware mechanisms.

In FIGS. 1 and 2, the example in which the post-processing apparatus 400 is coupled to the downstream side of the enclosing-sealing processing apparatus 100 is illustrated as an example of the configuration of the print system 1. Typical examples of the post-processing apparatus 400 include a finisher that performs stapling processing, a stacker, and a bookbinding machine. The system configuration of the print system 1 may be such a configuration in which the enclosing-sealing processing apparatus 100 is placed on the most downstream side.

Configuration Related to Conveyance Operation in Enclosing-Sealing Processing Apparatus 100

Figure 3:
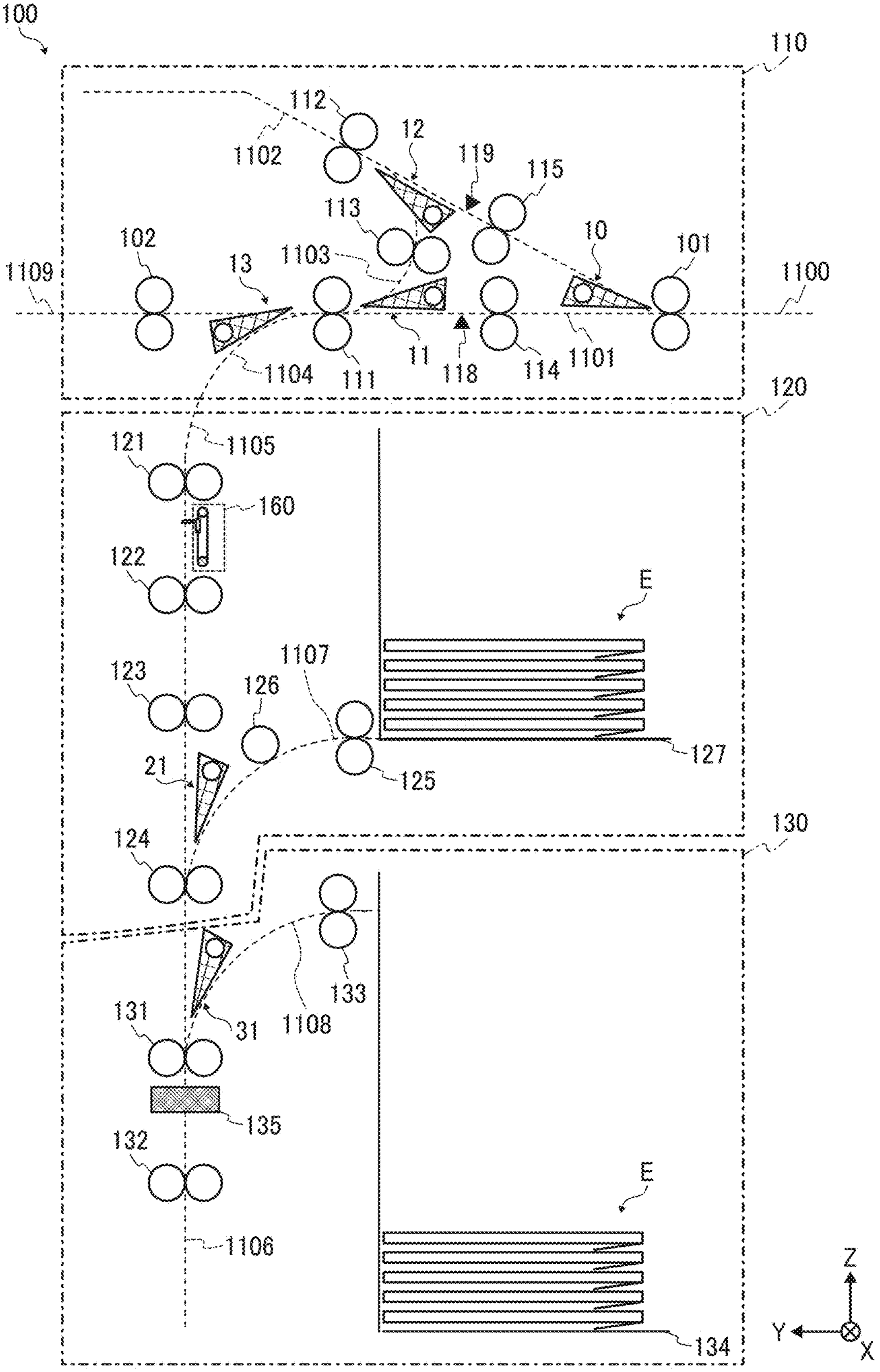
FIG. 3 is a diagram illustrating the internal configuration of an enclosing-sealing processing apparatus according to an embodiment of the present disclosure.

With reference to FIG. 3, a description is given of conveying rollers of the sheet conveying device 110, the enclosing device 120, the flap opening mechanism, and the sealer 130 in the enclosing-sealing processing apparatus 100, switching plates that switch the conveyance direction of an object to be conveyed, and conveyance paths on which the above-described components are arranged.

Configuration of Sheet Conveying Device 110

As illustrated in FIG. 3, the sheet conveying device 110 includes a plurality of conveyance paths defined as an entry path 1100, a first conveyance path 1101, a second conveyance path 1102, a switchback conveyance path 1103, an enclosing conveyance path 1104 as a fourth conveyance path, and a sheet exit path 1109.

An entrance roller pair 101 is disposed in the entry path 1100. The entry path 1100 is a path that receives the folded sheet Sf ejected from an apparatus located on the upstream side (for example, the folding processing apparatus 300). The enclosing-and-sealing controller 190 receives the enclosing target information as the information related to the folded sheet Sf from the controllers (the printer controller 260 and the folding controller 320) upstream from the enclosing-and-sealing controller 190, and controls the start and stop of the rotation of the entrance roller pair 101.

A first conveying roller pair 111 serving as a first conveyor and a first intermediate conveying roller pair 114 are disposed in the first conveyance path 1101. The first conveyance path 1101 is one of a plurality of conveyance paths disposed on the downstream side of the entrance roller pair 101 and branches off from the entry path 1100. A first sheet detection sensor 118 as a first medium sensor that detects an end (trailing end) of the conveyed folded sheet Sf is disposed on the first conveyance path 1101. The first sheet detection sensor 118 is disposed between the first intermediate conveying roller pair 114 and the first conveying roller pair 111.

A second conveying roller pair 112 serving as a second conveyor and a second intermediate conveying roller pair 115 are disposed in the second conveyance path 1102. The second conveyance path 1102 is one of conveyance paths disposed on the downstream side of the entrance roller pair 101 and branches from the entry path 1100 in a direction different from the direction of the first conveyance path 1101. A second sheet detection sensor 119 as a second medium sensor that detects an end (trailing end) of the conveyed folded sheet Sf is disposed on the second conveyance path 1102. The second sheet detection sensor 119 is disposed between the second intermediate conveying roller pair 115 and the second conveying roller pair 112.

The sheet conveying device 110 includes the switchback conveyance path 1103. The switchback conveyance path 1103 is a conveyance path that connects a joining position where the conveyance path joins with the first conveyance path 1101 at a position downstream from the first conveying roller pair 111 and a branching position where the conveyance path branches from the second conveyance path 1102 at a position upstream from the second intermediate conveying roller pair 115. The switchback conveyance path 1103 switches the conveyance direction of the folded sheet Sf conveyed on the second conveyance path 1102 in the downstream direction, and the folded sheet Sf is conveyed to the first conveyance path 1101 by switchback conveyance. A switchback conveying roller pair 113 serving as a third conveyor is disposed in the switchback conveyance path 1103 serving as a third conveyance path.

The sheet conveying device 110 includes the sheet exit path 1109 as a conveyance path on the downstream side following the first conveyance path 1101. The sheet exit path 1109 sends out the sheet S or the folded sheet Sf, which has passed through the sheet conveying device 110, toward the post-processing apparatus 400 on the downstream side. An exit roller pair 102 is disposed in the sheet exit path 1109.

When enclosing processing to be described below is not performed on the folded sheet Sf conveyed from the folding processing apparatus 300, the folded sheet Sf passes through the first conveyance path 1101 from the entry path 1100 and is ejected to the apparatus on the downstream side via the sheet exit path 1109. In the following description, processing in which the sheet S or the folded sheet Sf conveyed from the entrance roller pair 101 is conveyed to the exit roller pair 102 via the first conveyance path 1101 and is further conveyed downstream may be referred to as "normal conveying processing". The sheet conveying device 110 performs the normal conveying processing not when an "envelope job" that encloses the sheet S or the folded sheet Sf is performed but when a "print job" is performed that conveys the sheet S or the folded sheet Sf to the post-processing apparatus 400 as it is.

The sheet conveying device 110 includes the enclosing conveyance path 1104 as the fourth conveyance path that is branched from the first conveyance path 1101 on the downstream side of the first conveying roller pair 111 and continues to an enclosing roller pair 121 which holds the envelope E in which the folded sheet Sf is enclosed. As described below, the enclosing conveyance path 1104 as an enclosure conveyance path communicates with an envelope conveyance path 1105.

The sheet conveying device 110 is provided with a branching plate 10 as a brancher at a branching position for conveying the folded sheet Sf from the entry path 1100 to either the first conveyance path 1101 or the second conveyance path 1102. The branching plate 10 switches a conveyance path between the first conveyance path 1101 and the second conveyance path 1102, based on enclosing target information relating to the folded sheet Sf entering the entry path 1100 so that the branching plate 10 guides the folded sheet Sf to the first conveyance path 1101 or the second conveyance path 1102.

The sheet conveying device 110 is provided with a first switching plate 11 as a first switcher at a joining position where the switchback conveyance path 1103 joins the first conveyance path 1101. The first switching plate 11 switches between a state in which the folded sheet Sf conveyed from the entry path 1100 to the first conveyance path 1101 is conveyed to the first conveying roller pair 111 and a state in which the folded sheet Sf is conveyed from the switchback conveyance path 1103 to the first conveyance path 1101.

The sheet conveying device 110 is provided with a second switching plate 12 as a second switcher at a branching position where the switchback conveyance path 1103 branches from the second conveyance path 1102. The second switching plate 12 switches between a state in which the folded sheet Sf conveyed from the entry path 1100 to the second conveyance path 1102 is conveyed to the second conveying roller pair 112 and a state in which the folded sheet Sf is conveyed in a switchback manner from the second conveyance path 1102 to the switchback conveyance path 1103.

The sheet conveying device 110 is provided with a third switching plate 13 as a third switcher at a branching position where the enclosing conveyance path 1104 branches from the first conveyance path 1101. The third switching plate 13 switches between a state in which the folded sheet Sf conveyed by the first conveyance path 1101 is conveyed to the enclosing conveyance path 1104 and a state in which the folded sheet Sf is conveyed to the sheet exit path 1109.

The folded sheet Sf conveyed to the first conveyance path 1101 is conveyed to the first conveying roller pair 111 by the first intermediate conveying roller pair 114. The first conveying roller pair 111 conveys the conveyed folded sheet Sf downstream. When the third switching plate 13 is in a state illustrated in FIG. 3, i.e., when the third switching plate 13 opens the enclosing conveyance path 1104 and closes a conveyance path that passes through the exit roller pair 102 as a direction in which the folded sheet Sf is conveyed, the folded sheet Sf is conveyed to the enclosing conveyance path 1104. After the trailing end of the folded sheet Sf conveyed from the first intermediate conveying roller pair 114 to the first conveying roller pair 111 is detected by the first sheet detection sensor 118, the folded sheet Sf turns into the state where the folded sheet Sf has already moved to the enclosing conveyance path 1104 when the folded sheet Sf is conveyed by a predetermined distance. When the enclosing-and-sealing controller 190 determines that the folded sheet Sf has reached the above-described state, the operation of each conveying roller pair rotating in the sheet conveying device 110 is stopped.

The driving source for operating each pair of conveying rollers included in the enclosing-sealing processing apparatus 100 is configured to individually supply a driving force to each pair of rollers. For example, a motor serving as a driving source corresponding to each conveying roller pair is individually provided. Rotation control of each motor is individually performed. As a result, the control is performed such that a specific conveying roller pair is rotated and the other conveying roller pairs are stopped. A plurality of roller pairs may be driven by a single motor. Even in this case, rotation and non-rotation of each roller (roller pair) may be individually controlled.

The folded sheet Sf conveyed to the second conveyance path 1102 is conveyed to the second conveying roller pair 112 by the second intermediate conveying roller pair 115. When the trailing end of the conveyed folded sheet Sf is detected by the second sheet detection sensor 119 and conveyed by a predetermined distance, the second conveying roller pair 112 is temporarily stopped and then rotated in reverse. As a result, the folded sheet Sf is ready to be conveyed to the switchback conveyance path 1103 in a switchback manner. At this time, before or simultaneously with the reverse rotation of the second conveying roller pair 112, the second switching plate 12 is rotated at a timing at which the trailing end of the folded sheet Sf has passed through the second switching plate 12 (this operation is also determined based on the detection of the second sheet detection sensor 119). Thus, the second switching plate 12 is switched to a state in which the folded sheet Sf is conveyed to the switchback conveyance path 1103.

When the folded sheet Sf is guided from the second conveyance path 1102 to the switchback conveyance path 1103, the folded sheet Sf is conveyed toward the first conveyance path 1101 by the switchback conveying roller pair 113.

Configuration of Enclosing Device 120

As illustrated in FIG. 3, the enclosing device 120 is provided with the envelope conveyance path 1105 as a vertical conveyance path connected to the enclosing conveyance path 1104 as the fourth conveyance path disposed in the sheet conveying device 110. The envelope conveyance path 1105 extends in a direction intersecting the ground plane (X-Y plane) of the enclosing-sealing processing apparatus 100, more specifically, in a direction (Z direction) orthogonal to the X-Y plane. In other words, the envelope conveyance path 1105 is a conveyance path extending in a substantially vertical direction from the enclosing conveyance path 1104.

In the envelope conveyance path 1105, an envelope E loaded on an envelope loading tray 127 as an envelope loader is conveyed to a sealing position by the operation of a plurality of conveying roller pairs. The sealed envelope E is conveyed and ejected from the sealing position to the envelope ejection tray 134 by the operations of the conveying roller pairs. The series of conveying operations of the envelope E includes a switchback conveying operation in which the envelope E is conveyed in a direction opposite to a direction in which the envelope E is once conveyed. The enclosure is conveyed to the envelope conveyance path 1105. The envelope conveyance path 1105 is directly connected to the enclosing conveyance path 1104 branched from the first conveyance path 1101. As a result, a part of the envelope conveyance path 1105 also constitutes part of a conveyance path for the enclosure.

As described above, the configuration for conveying the envelope E for the enclosing operation and the sealing operation and the configuration for conveying the enclosure for the envelope E are arranged in the vertical direction with respect to the mounting surface of the enclosing-sealing processing apparatus 100. Thus, the installation area of the enclosing-sealing processing apparatus 100 can be reduced. The print system 1 including the enclosing-sealing processing apparatus 100 can also be reduced in size.

The envelope conveyance path 1105 includes an envelope holding mechanism that conveys the envelope E to an enclosing position as a predetermined position and holds the envelope E so that an enclosure is enclosed. The envelope conveyance path 1105 is connected to a sealing path 1106 for performing sealing processing on the envelope E in which the enclosure has been enclosed.

A first vertical conveying roller pair 122 and a second vertical conveying roller pair 123 are disposed in the envelope conveyance path 1105. The first vertical conveying roller pair 122 and the second vertical conveying roller pair 123 serve as envelope conveyors for conveying the envelope E to a position where the folded sheet Sf is received. The enclosing roller pair 121 serving as an enclosure conveyor that conveys and supplies an enclosure to the envelope E is disposed above the first vertical conveying roller pair 122 (in the +Z direction) in the envelope conveyance path 1105.

The enclosing roller pair 121 conveys the enclosure in the enclosing direction (−Z direction) to perform the enclosing operation with respect to the envelope E conveyed to and held at the enclosing position by the first vertical conveying roller pair 122 and the second vertical conveying roller pair 123.

In addition, an enclosing mechanism is disposed between the enclosing roller pair 121 and the first vertical conveying roller pair 122 and on a lateral side of the envelope conveyance path 1105. The enclosing mechanism performs an operation of pushing the enclosure toward the opening of the envelope E during the enclosing operation.

A flap opening mechanism is disposed at a connecting position of the conveyance path from the envelope conveyance path 1105 to the sealing path 1106. The flap opening mechanism performs processing of opening the flap ef when the envelope E taken out from the envelope loading tray 127 as an envelope holding tray is conveyed to the envelope conveyance path 1105.

An envelope switchback switching plate 21 is disposed at a merging point where the envelope conveyance path 1105 and the envelope entry path 1107 merge with each other.

Further, a position below the envelope switchback switching plate 21 (in the −Z direction) where the envelope entry path 1107 and the envelope conveyance path 1105 merges with each other is defined as a first branch position. A flap opening roller pair 124 is disposed below the first branch position (in the −Z direction).

The flap opening roller pair 124 disposed below the first branch position and the first vertical conveying roller pair 122 disposed above the first branch position constitute first conveying roller pairs.

A separation roller pair 125 and an envelope conveying roller pair 126 are disposed in the envelope entry path 1107 that joins the envelope conveyance path 1105. One of the loaded envelopes E is taken out from the envelope loading tray 127 by the separation roller pair 125. The envelope E is supplied to the envelope conveyance path 1105 by the separation roller pair 125 and the envelope conveying roller pair 126 as an envelope supply unit.

As illustrated in FIG. 3, multiple envelopes E are placed on the envelope loading tray 127. The envelope E placed on the envelope loading tray 127 is in a state where the bottom which is an opposite end of the flap ef faces the separation roller pair 125. Accordingly, the bottom of the envelope E serves as the leading end of the envelope E in the envelope conveyance direction DE when the envelope E is ejected from the envelope loading tray 127.

Thus, in the present embodiment, the bottom of an envelope E separated from envelopes E loaded on the envelope loading tray 127 corresponds to the "leading end in the conveyance direction". The side where the flap ef is located corresponds to the "trailing end in the conveyance direction". The "trailing end of the envelope E in the conveyance direction" with the flap ef closed is a folding position of the flap ef in the envelope E, and the "trailing end of the envelope E in the conveyance direction" with the flap ef open is an end of the flap ef.

The envelope E is conveyed to a position beyond the envelope switchback switching plate 21 by the separation roller pair 125 and the envelope conveying roller pair 126.

The envelope switchback switching plate 21 rotates and is held at one of a position for temporarily conveying the envelope E taken out from the envelope loading tray 127 to the sealing path 1106 and a position for conveying the envelope E toward the sheet conveying device 110 in the envelope conveyance path 1105. In other words, the envelope switchback switching plate 21 is a member that switches the conveyance direction of the envelope E.

The first vertical conveying roller pair 122 and the second vertical conveying roller pair 123 convey and hold the envelope E at a predetermined position on the envelope conveyance path 1105. As described below, the predetermined position is a position where the position of the opening of the envelope E (the position of the flap ef) is lower than the enclosing roller pair 121 and higher than the first vertical conveying roller pair 122.

The enclosing roller pair 121 is a type of conveying roller that rotates in a direction in which the folded sheet Sf conveyed from the sheet conveying device 110 is enclosed in the envelope E.

Configuration of Sealer 130

As illustrated in FIG. 3, the sealer 130 includes a third vertical conveying roller pair 131 and a fourth vertical conveying roller pair 132 serving as a switchback conveyor that are disposed in the sealing path 1106. The sealer 130 further includes an envelope ejection path 1108 that branches from the sealing path 1106 at a second branching position. An envelope ejection switching plate 31 is disposed at the second branching position. An envelope ejecting roller pair 133 is disposed at an end of the envelope ejection path 1108.

The third vertical conveying roller pair 131 and the fourth vertical conveying roller pair 132 constitute second conveying roller pairs, and convey and hold the envelope E at a predetermined position of the sealing path 1106.

The envelope ejection switching plate 31 rotates between a position for conveying the envelope E from the flap opening roller pair 124 to the third vertical conveying roller pair 131 in the enclosing conveyance path 1104 and a position for conveying the envelope E from the enclosing conveyance path 1104 to the envelope ejection path 1108. The envelope ejection switching plate 31 is a member that switches the conveyance direction of the envelope E.

A sealing mechanism 135 as a sealer that performs "sealing processing" of closing the flap ef is disposed in the sealing path 1106. If the flap ef of the envelope E conveyed by the third vertical conveying roller pair 131 and the fourth vertical conveying roller pair 132 is open, the sealing mechanism 135 performs processing of closing the flap ef.

The envelope ejection roller pair 133 is a roller pair that ejects the envelope E toward the envelope ejection tray 134.

The envelope ejection tray 134 serving as an envelope stacker is a tray on which the ejected envelope E is placed.

As described above, the conveyance paths that convey the folded sheet Sf from the sheet conveying device 110 to the enclosing device 120 and the sealer 130 are disposed to be connected in the vertical direction (Z direction) in the enclosing-sealing processing apparatus 100. The conveyance paths that convey the folded sheet Sf and the envelope E construct a vertical conveyance path that couples the envelope conveyance path 1105 of the enclosing device 120 with the sealing path 1106 of the sealer 130 vertically in the Z-direction.

A description is provided of a continuation of the series of processes for enclosing and sealing.

An example of a series of processes of the enclosing operation and the sealing operation in the enclosing-sealing processing apparatus 100 is described below with reference to FIGS. 4 to 15. In FIGS. 4 to 15, reference numerals and the like are assigned to elements used in the description of the series of processes for enclosing.

Figure 4:
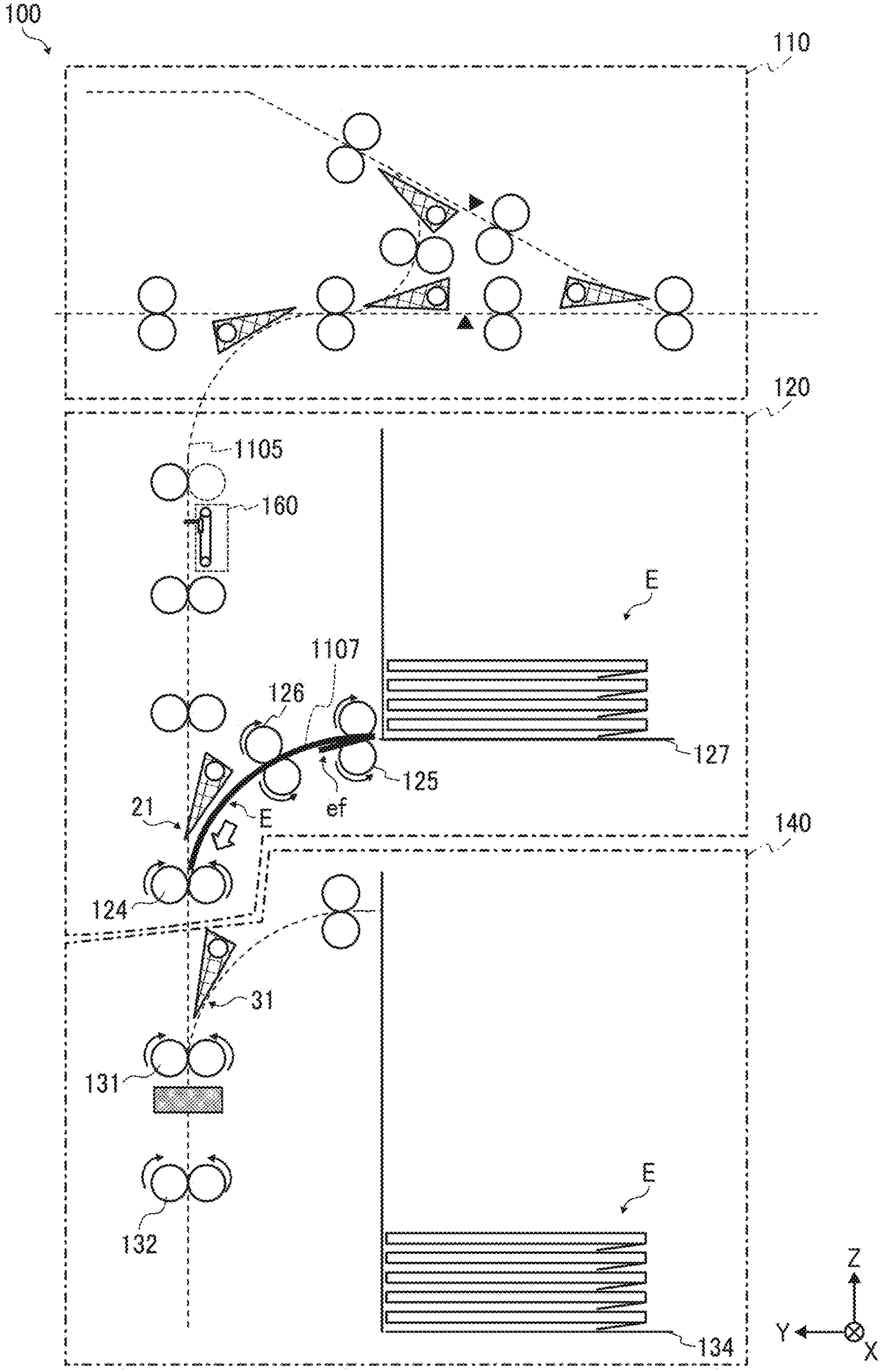
FIG. 4 is a diagram illustrating a step of an enclosing operation of the enclosing-sealing processing apparatus of FIG. 3.

First, as illustrated in FIG. 4, a plurality of envelopes E loaded on an envelope loading tray 127 as an envelope loader are separated one by one by a separation roller pair 125 and supplied to an envelope entry path 1107 serving as an envelope conveyance path. In other words, the envelopes E are loaded on the envelope loading tray 127 in a state where the envelopes E can be supplied to the envelope entry path 1107.

The envelope E separated from the loading position of the envelope loading tray 127 passes through the envelope entry path 1107 by the envelope conveying roller pair 126 and is conveyed to the flap opening roller pair 124. At this time, the envelope switchback switching plate 21 and the envelope ejection switching plate 31 are oriented in the directions illustrated in FIG. 3. In addition, the flap opening roller pair 124, the third vertical conveying roller 131, and the fourth vertical conveying roller pair 132 rotate in a direction in which the envelope E is conveyed downward, and convey the envelope E to a predetermined position in the enclosing conveyance path 1104.

Figure 5:
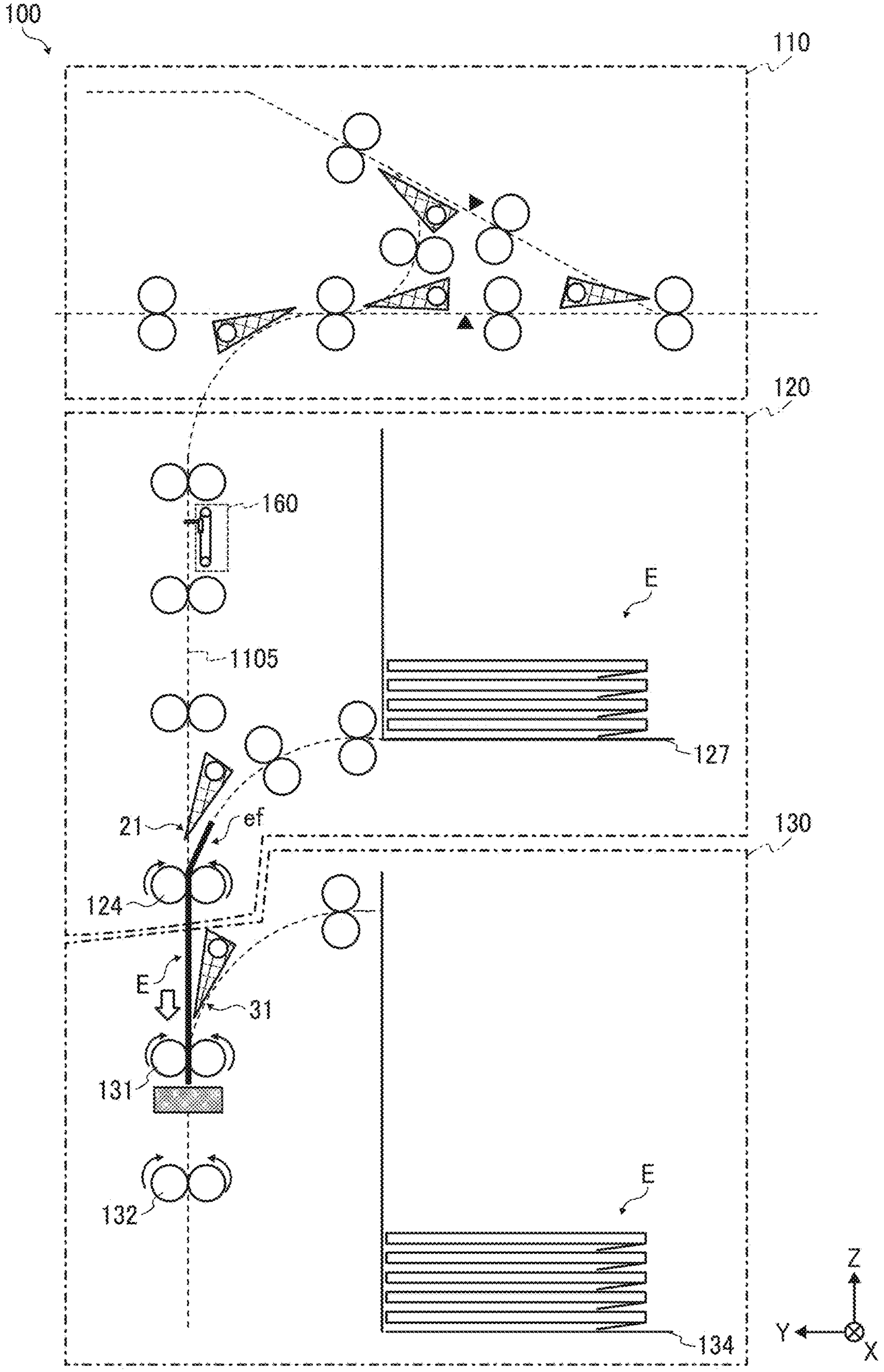
FIG. 5 is a diagram illustrating a step of the enclosing operation of the enclosing-sealing processing apparatus, subsequent to the step illustrated in FIG. 4.

Subsequently, as illustrated in FIG. 5, when the envelope E completely passes through the flap opening roller pair 124, the flap ef is opened by the flap opening mechanism. From this state, the flap opening roller pair 124, the third vertical conveying roller pair 131, and the fourth vertical conveying roller pair 132 rotate to convey the envelope E to the position illustrated in FIG. 6.

Figure 6:
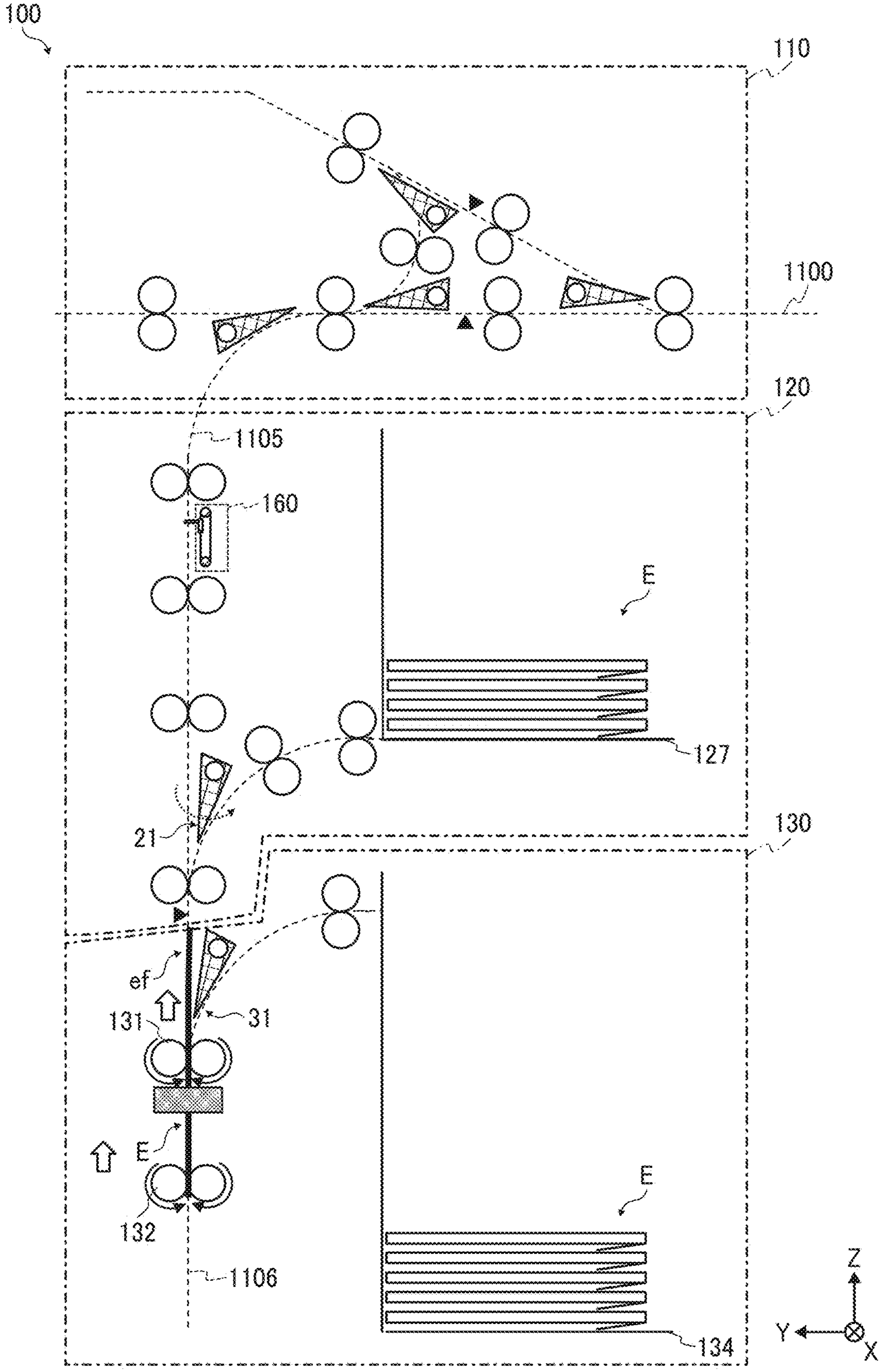
FIG. 6 is a diagram illustrating an operation of a flap opening mechanism in the enclosing operation of the enclosing-sealing processing apparatus, subsequent to the step illustrated in FIG. 5.

Subsequently, as illustrated in FIG. 6, the flap ef of the envelope E, which remains opened, reaches a position where the flap ef has passed through the flap opening roller pair 124, the third vertical conveying roller pair 131 and the fourth vertical conveying roller pair 132 rotate in reverse. By this operation, the envelope E is switched back and conveyed toward a predetermined position of the enclosing device 120. The envelope switchback switching plate 21 rotates in a direction illustrated by a dashed arrow in FIG. 6 before switchback conveyance of the envelope E starts or simultaneously with the start of switchback conveyance. As a result, the envelope E turns into the state in which the envelope E can be conveyed upward in the envelope conveyance path 1105. Envelope switchback rollers include the flap opening roller pair 124, the third vertical conveying roller pair 131, and the fourth vertical conveying roller pair 132.

Figure 7:
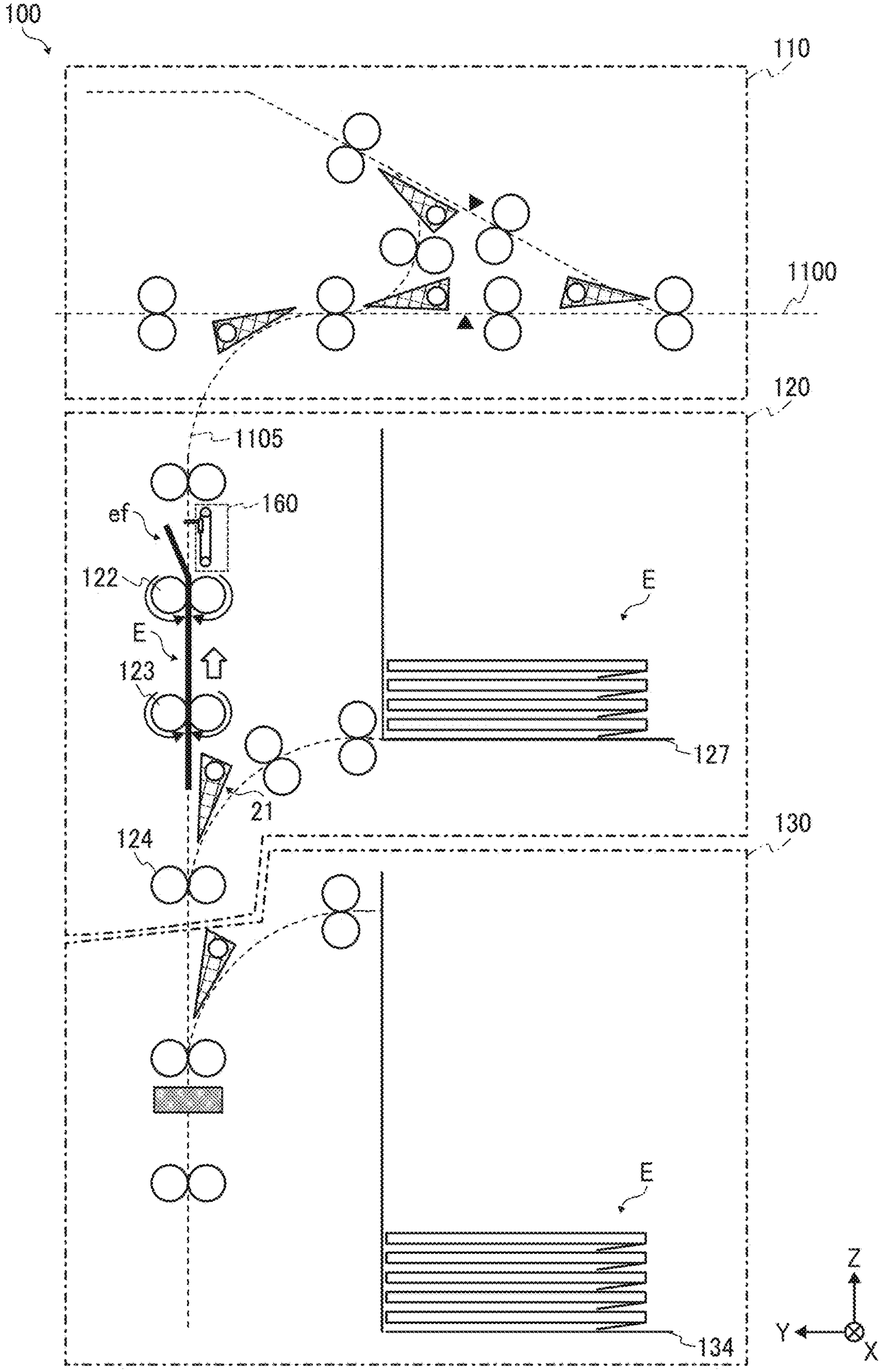
FIG. 7 is a diagram illustrating a step of the enclosing operation of the enclosing-sealing processing apparatus, subsequent to the step illustrated in FIG. 6.

As illustrated in FIG. 7, the second vertical conveying roller pair 123 and the first vertical conveying roller pair 122 included in the switchback conveyor convey the envelope E to the enclosing position. When the flap ef has reached a position where the flap ef passes through the first vertical conveying roller pair 122, the rotations of the second vertical conveying roller pair 123 and the first vertical conveying roller pair 122 are stopped, and the enclosing standby operation is started.

In the control of conveying the envelope E to the enclosing position, the processing that calculates the conveyance amount of the envelope E from the rotation amount of each conveying roller is executed after the separation roller pair 125 takes out the envelope E from the envelope loading tray 127. In addition, the position of the envelope E in the enclosing conveyance path 1104 can be determined based on the calculated lengths of the envelope E and the flap ef, the calculated conveyance amount of the envelope E, and the conveyance path length by which the envelope E is conveyed through the envelope entry path 1107 and the envelope conveyance path 1105.

Figure 8:
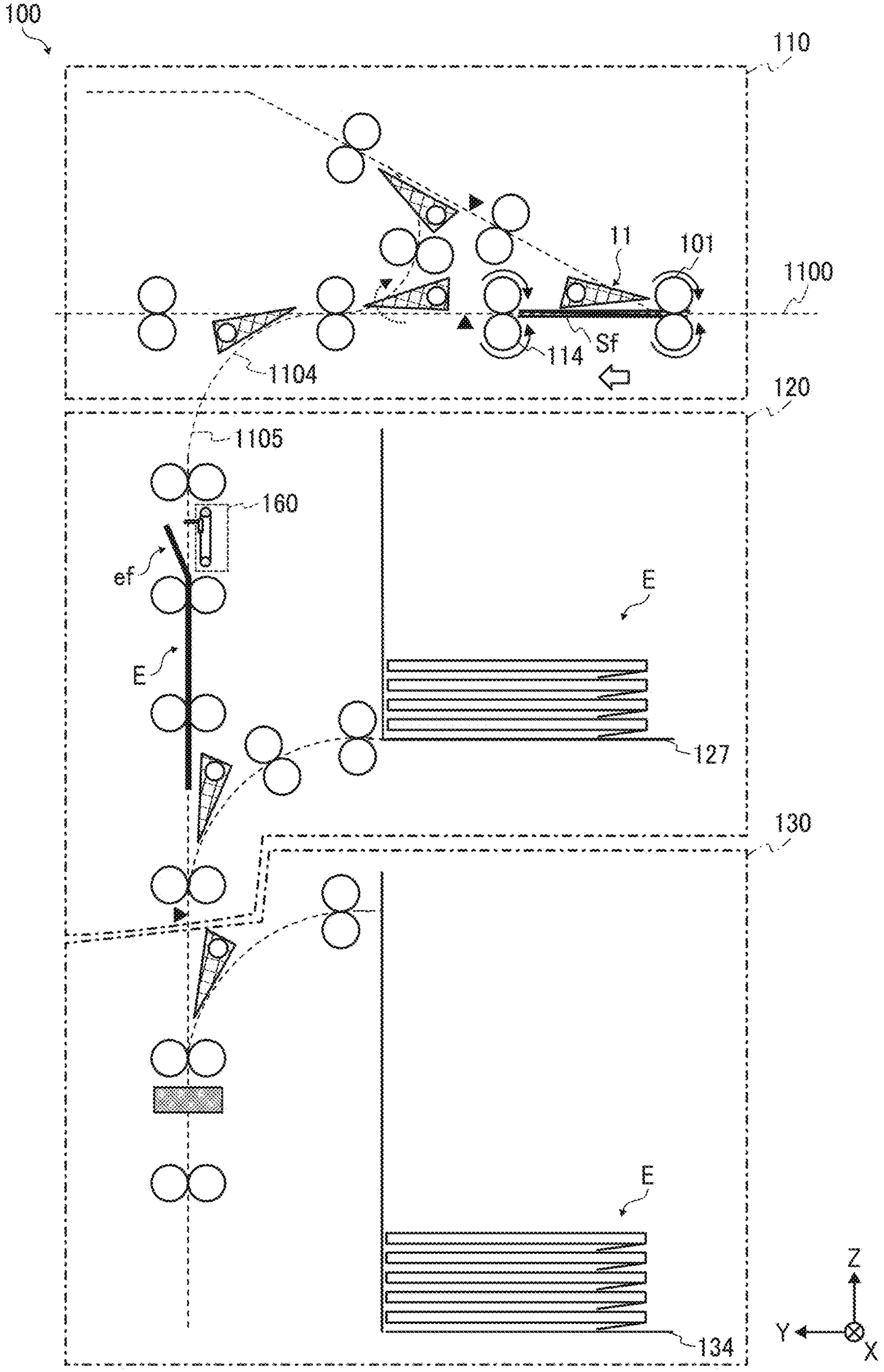
FIG. 8 is a diagram illustrating a step of the enclosing operation of the enclosing-sealing processing apparatus, subsequent to the step illustrated in FIG. 7.

Subsequently, as illustrated in FIG. 8, in a state where the envelope E is held at the enclosing position, the enclosing-sealing processing apparatus 100 receives the folded sheet Sf from the upstream apparatus (the folding processing apparatus 300) by the entrance roller pair 101 and conveys the folded sheet Sf to the first conveyance path 1101.

Figure 9:
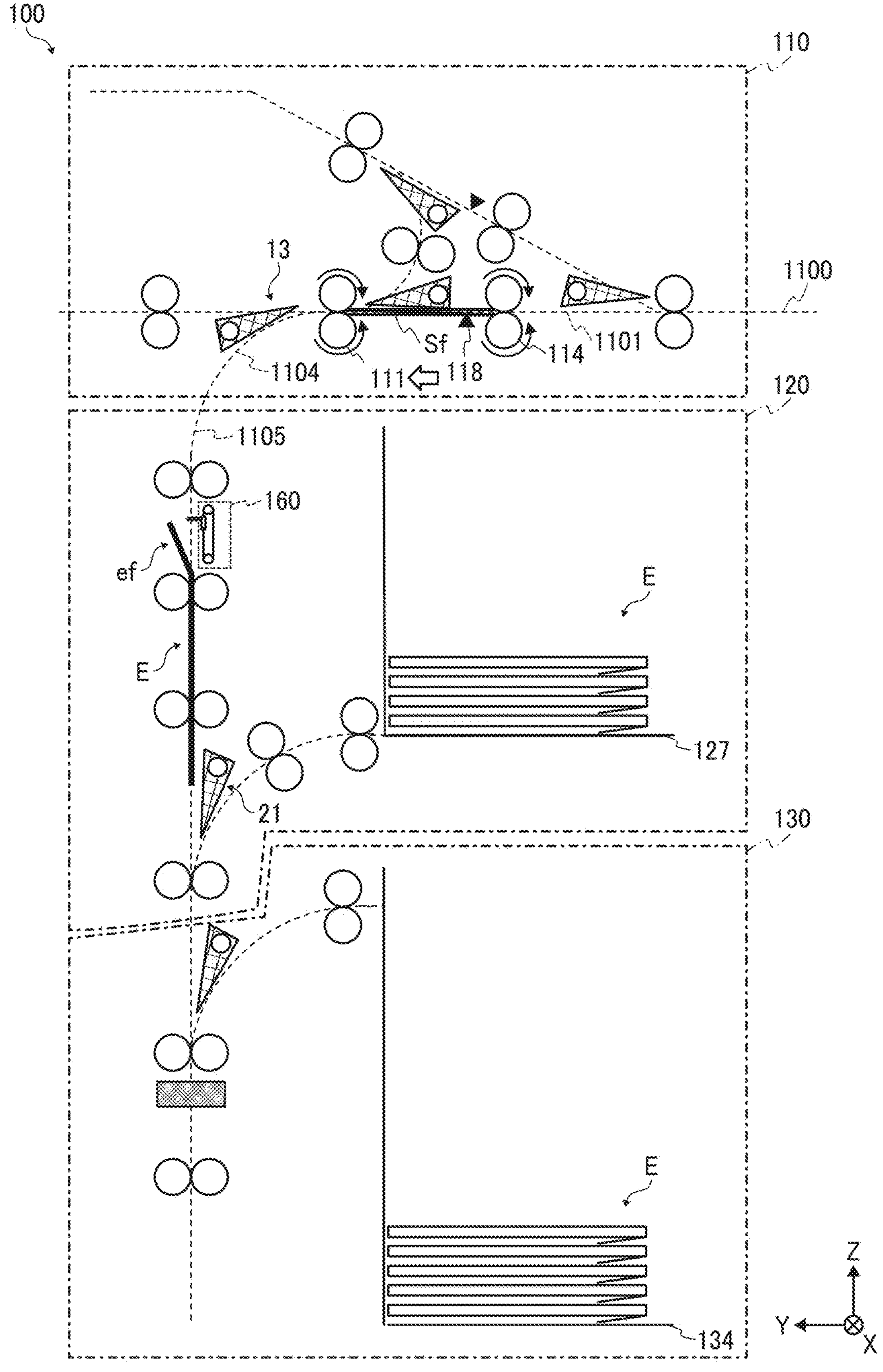
FIG. 9 is a diagram illustrating a step of the enclosing operation of the enclosing-sealing processing apparatus, subsequent to the step illustrated in FIG. 8.

Subsequently, as illustrated in FIG. 9, the first intermediate conveying roller pair 114 and the first conveying roller pair 111 convey the folded sheet Sf downstream in the sheet conveyance direction DS. At this time, the first switching plate 11 and the third switching plate 13 are positioned as illustrated in FIG. 9. The folded sheet Sf is conveyed from the first conveyance path 1101 to the enclosing conveyance path 1104.

Figure 10:
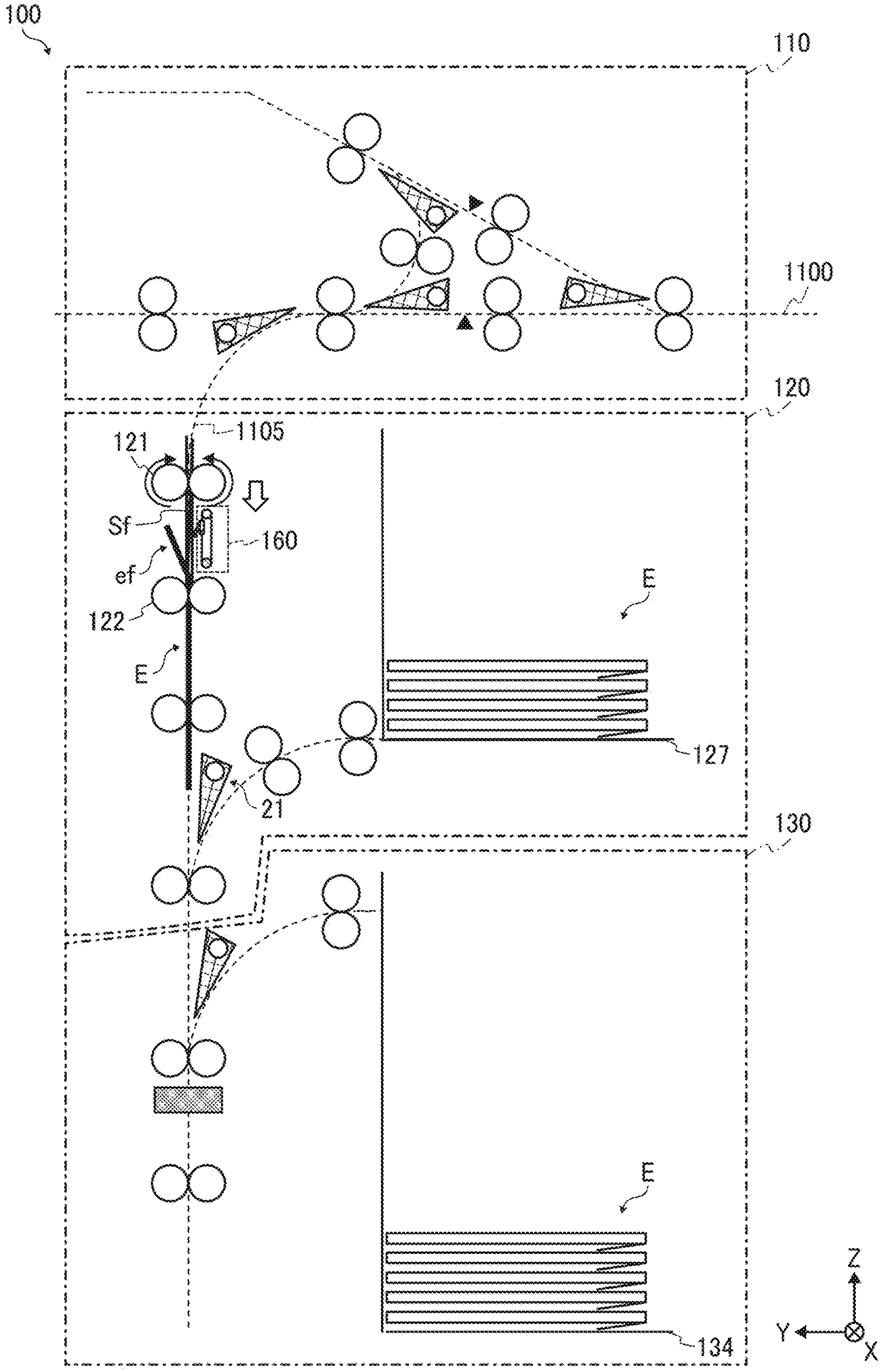
FIG. 10 is a diagram illustrating a step of the enclosing operation of the enclosing-sealing processing apparatus, subsequent to the step illustrated in FIG. 9.

Then, as illustrated in FIG. 10, the enclosing roller pair 121 conveys the folded sheet Sf conveyed from the enclosing conveyance path 1104 to the envelope conveyance path 1105 farther in the negative Z-direction. As a result, the first vertical conveying roller pair 122 and other roller pairs hold the folded sheet Sf at the predetermined enclosing position in the envelope conveyance path 1105. The folded sheet Sf is inserted into the opened mouth of the envelope E in the enclosing standby state. In this enclosing operation, the enclosing mechanism operates, and the folded sheet Sf is pushed into the envelope E by the enclosure pusher 160 serving as an encloser.

Figure 11:
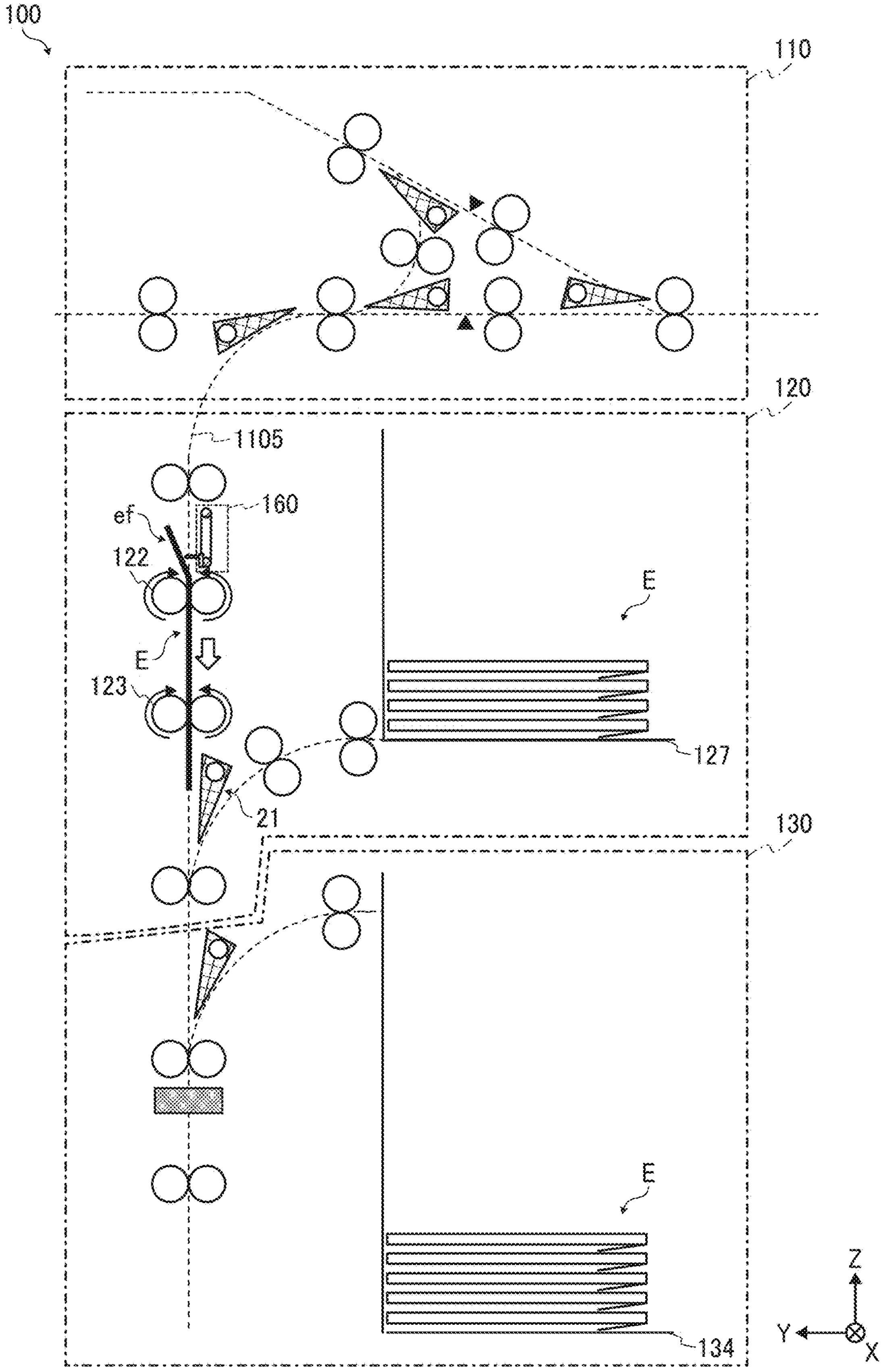
FIG. 11 is a diagram illustrating a step of the enclosing operation of the enclosing-sealing processing apparatus, subsequent to the step illustrated in FIG. 10.
Figure 12:
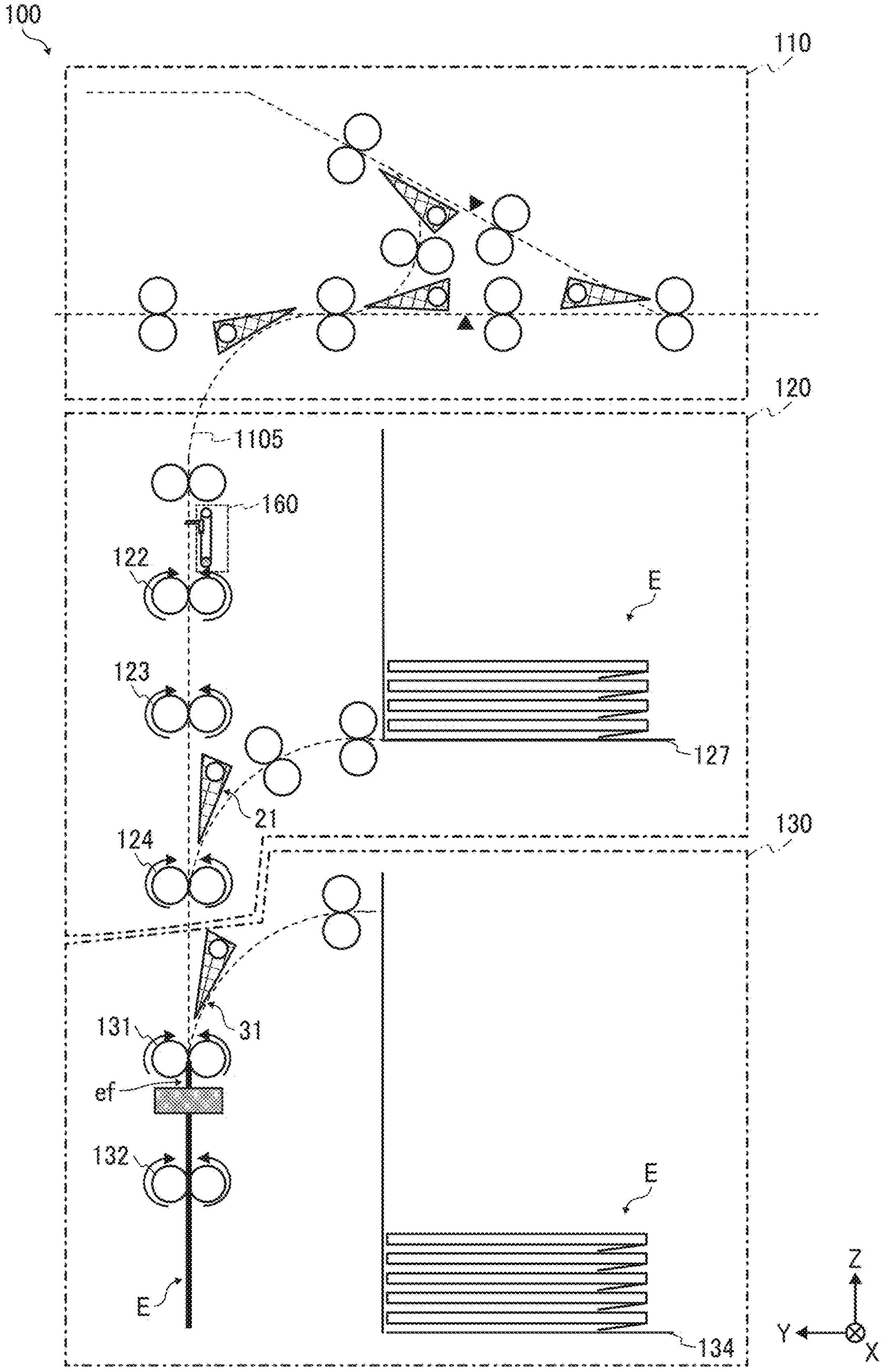
FIG. 12 is a diagram illustrating a step of the enclosing operation of the enclosing-sealing processing apparatus, subsequent to the step illustrated in FIG. 11.

Subsequently, as illustrated in FIG. 11, the first vertical conveying roller pair 122 and the second vertical conveying roller pair 123 rotate to convey the envelope E downward to the fourth vertical conveying roller pair 132 as illustrated in FIG. 12. The envelope E with the folded sheet Sf enclosed is conveyed to a position at which the flap ef is past the envelope ejection switching member 31.

Figure 13:
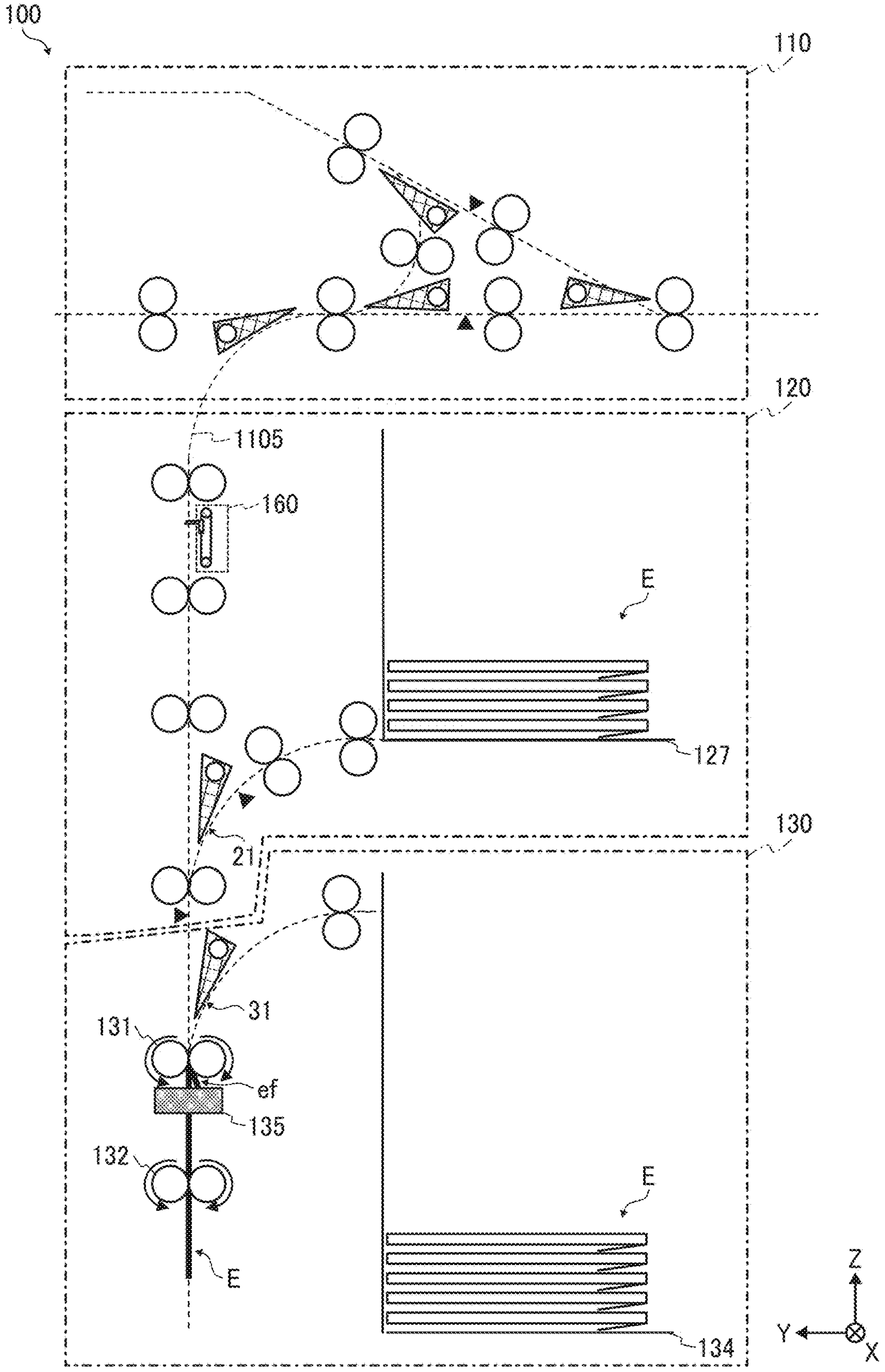
FIG. 13 is a diagram illustrating a step of the enclosing operation of the enclosing-sealing processing apparatus, subsequent to the step illustrated in FIG. 12.

Then, as illustrated in FIG. 13, the sealing mechanism 135 closes the flap between the third vertical conveying roller 131 and the fourth vertical conveying roller pair 132 to seal the envelope E.

Figure 14:
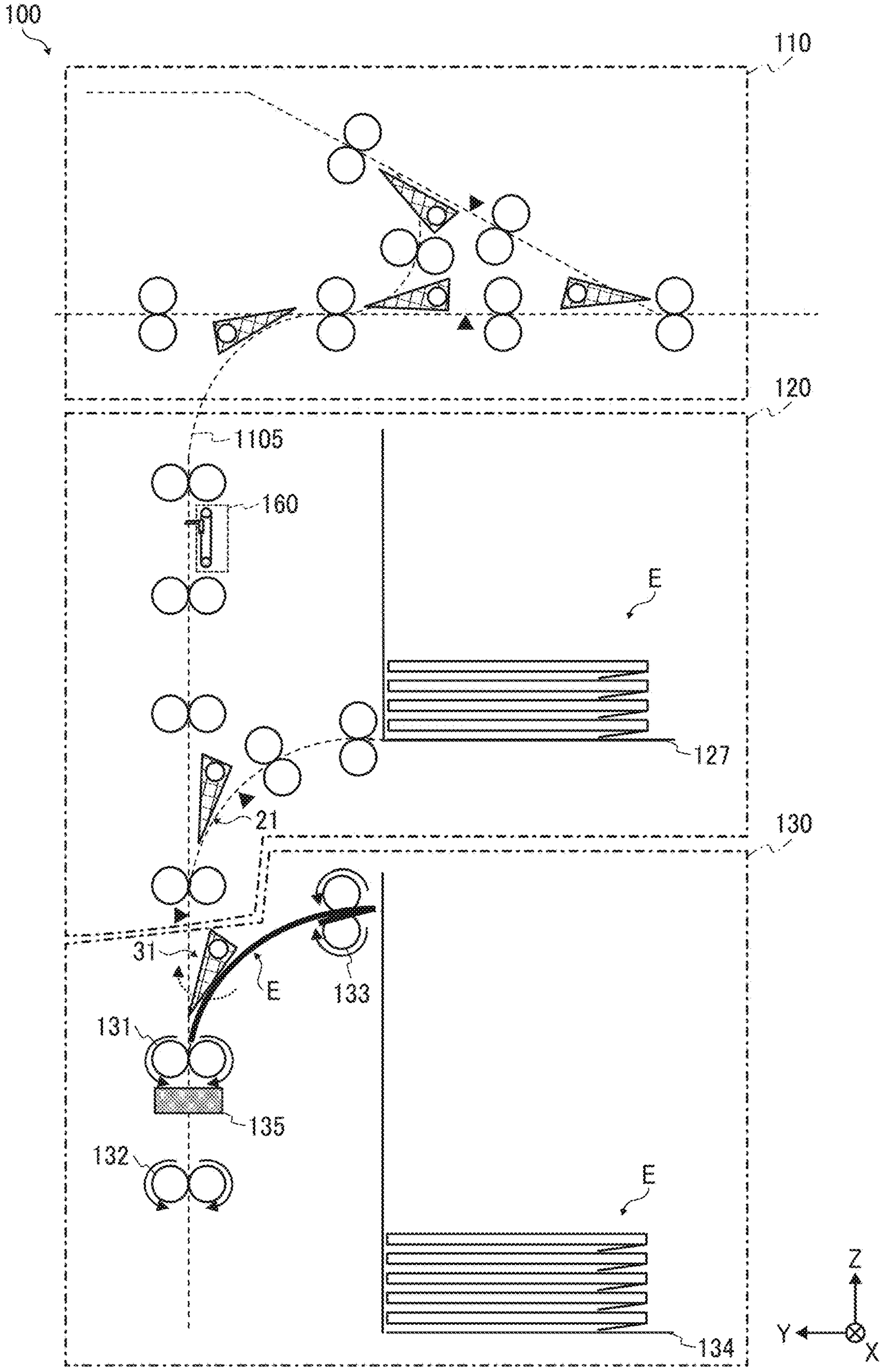
FIG. 14 is a diagram illustrating a step of the enclosing operation of the enclosing-sealing processing apparatus, subsequent to the step illustrated in FIG. 13.

As illustrated in FIG. 14, the third vertical conveying roller pair 131 and the fourth vertical conveying roller pair 132 rotate in reverse to switch back and convey the sealed envelope E. Before the third vertical conveying roller pair 131 and the fourth vertical conveying roller pair 132 rotate in reverse, the envelope ejection switching plate 31 rotates into the state illustrated in FIG. 16. Thus, the third vertical conveying roller pair 131 and the fourth vertical conveying roller pair 132 convey the envelope E with the folded sheet Sf enclosed, from the enclosing conveyance path 1104 to the envelope ejection path 1108.

Figure 15:
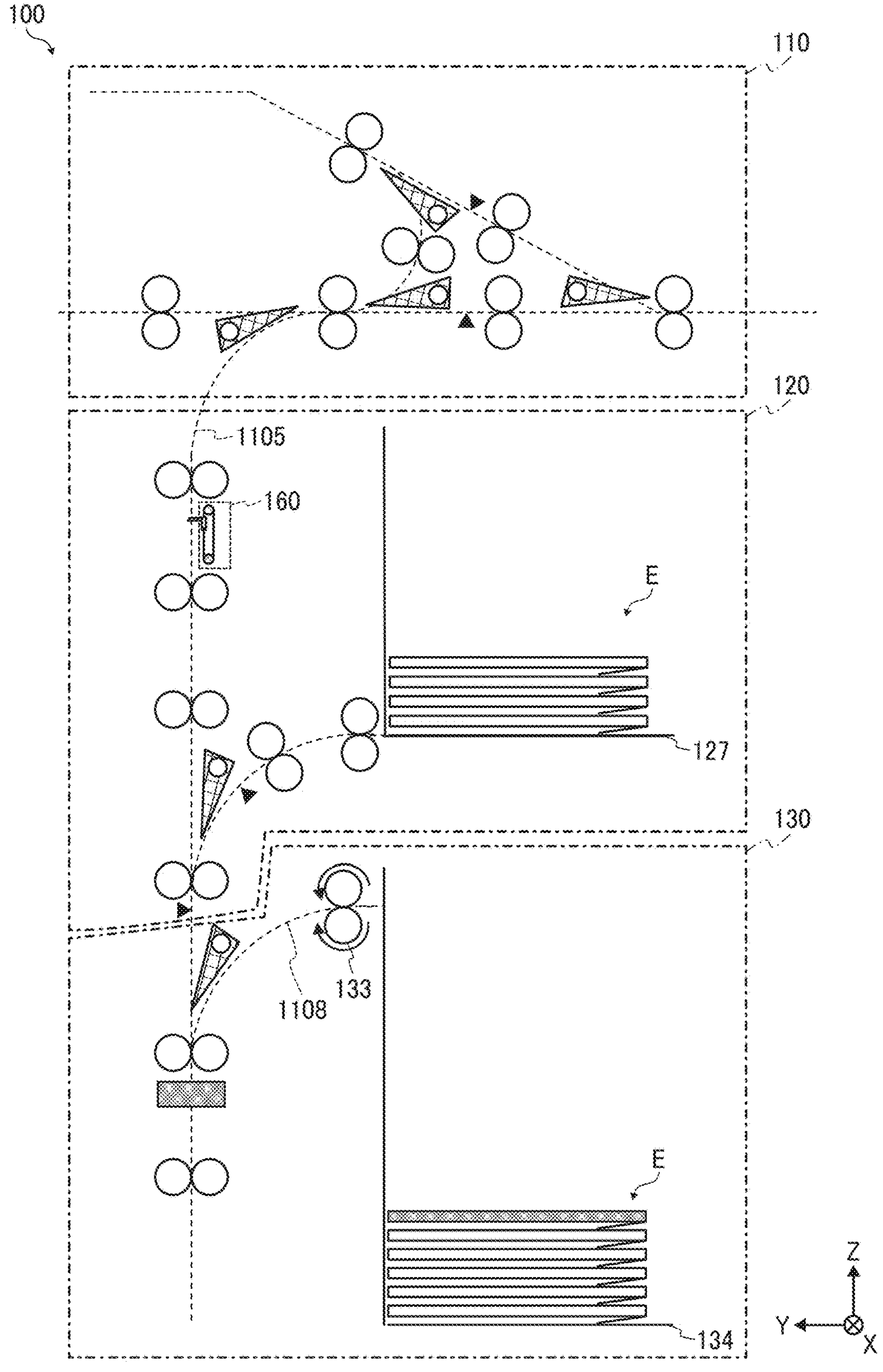
FIG. 15 is a diagram illustrating a step of the enclosing operation of the enclosing-sealing processing apparatus, subsequent to the step illustrated in FIG. 14.

As a result, as illustrated in FIG. 15, the envelope ejecting roller pair 133 ejects the sealed envelope E onto the envelope ejection tray 134.

No Translation

A description is given below of the configuration of an enclosing-sealing processing apparatus 100 serving as an enclosing-sealing apparatus according to another embodiment of the present disclosure. As described with reference to FIGS. 4 to 7, the envelope E is taken out from the envelope loading tray 127 serving as the envelope loader and is conveyed to the enclosing position via the envelope entry path 1107 serving as the envelope conveyance path. The envelopes E loaded on the envelope loading tray 127 are sequentially taken out from the envelope E at the lowermost stage of the loaded envelopes and are conveyed out to the envelope entry path 1107.

When the envelope E is loaded on the envelope loading tray 127, the envelope E is placed at a predetermined position with respect to the envelope entry path 1107. Specifically, the envelope E is loaded such that the position of the envelope E in a width direction of the envelope E matches an appropriate position with respect to the envelope entry path 1107. The position of the envelope E in the width direction of the envelope E is a position of the envelope E in a direction orthogonal to the conveyance direction of the envelope E as a direction in which the envelope E is conveyed into the envelope entry path 1107. The position of the envelope E in the width direction may be referred to as the positions of both ends of the envelope E in the direction orthogonal to the conveyance direction of the envelope E. For example, if the position of the envelope E deviates from an appropriate position with respect to the envelope entry path 1107 in the lateral direction with respect to the conveyance direction, a conveyance failure may occur when the envelope E is conveyed to the enclosing position. This displacement in the lateral direction may be referred to as lateral misregistration.

While the envelopes E are separated from the envelope loading tray 127 and are sequentially conveyed to the envelope entry path 1107, the envelopes E sequentially move downward. At this time, there is a possibility that the appropriate position with respect to the envelope entry path 1107 or the loaded position of the envelopes E is deviated.

First, when the envelope E is placed on the envelope loading tray 127, the position (loaded position) of the envelope E in the width direction with respect to the envelope loading tray 127 is restricted so that the envelope E stays at the appropriate position. The position of the envelope loading tray 127 in the width direction of the envelope E is adjusted such that the envelope loading tray 127, on which the position of the envelope E in the width direction of the envelope E is restricted, is placed at the appropriate position with respect to the envelope entry path 1107. This adjustment is performed in a state where the envelopes E are loaded on the envelope loading tray 127. Thus, the correction of the lateral registration can be performed with high accuracy.

Figure 16A:
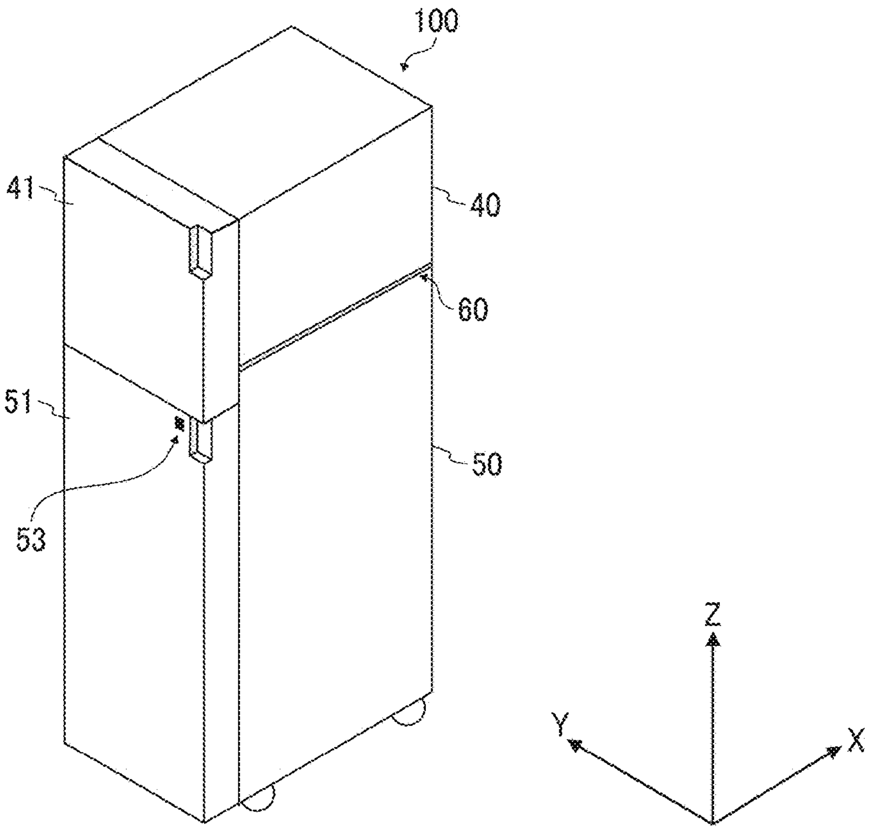
FIGS. 16A and 16B are perspective views of a housing structure of an enclosing-sealing processing apparatus according to an embodiment of the present disclosure.
Figure 16B:
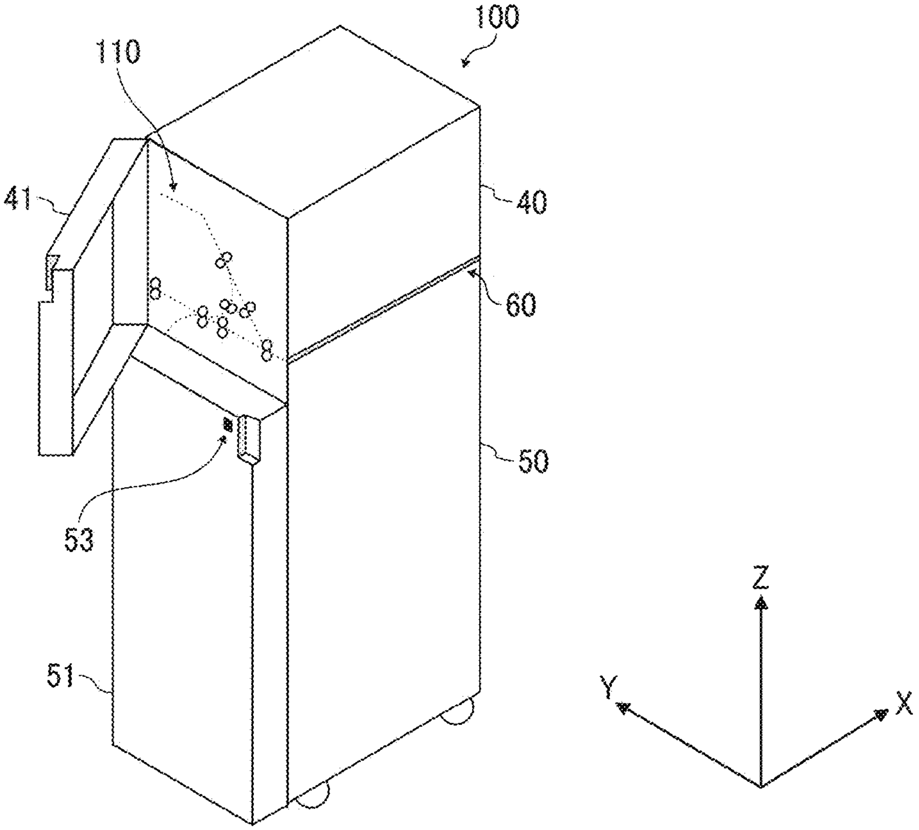

FIGS. 16A and 16B and 17A and 17B are external perspective views of an enclosing-sealing processing apparatus 100, according to an embodiment of the present disclosure. As illustrated in FIGS. 16A and 16B, the enclosing-sealing processing apparatus 100 has a configuration in which a sheet conveying unit 40 and an enclosing-sealing unit 50 are stacked in a vertical direction. The sheet conveying unit 40 includes a sheet conveying device 110. The enclosing-sealing unit 50 includes an enclosing device 120 and a sealer 130.

A sheet entry portion 60 corresponding to an entry port of a sheet S or a folded sheet Sf ejected from the upstream apparatus is disposed at a boundary between the sheet conveying unit 40 and the enclosing-sealing unit 50. The sheet conveying device 110 performs, on the conveyed sheet S, predetermined conveyance processing such as a “through conveyance operation” in which the sheet S is conveyed to a downstream apparatus as it is, an “enclosing conveyance operation” in which the sheet S is conveyed to the enclosing device 120, and a “reverse conveyance operation” in which an end of the sheet S in the conveyance direction is reversed.

As illustrated in FIGS. 16A and 16B, the sheet conveying unit 40 includes a first cover 41 serving as a unit cover, and the enclosing-sealing unit 50 includes a second cover 51 serving as a unit cover.

Figure 17A:
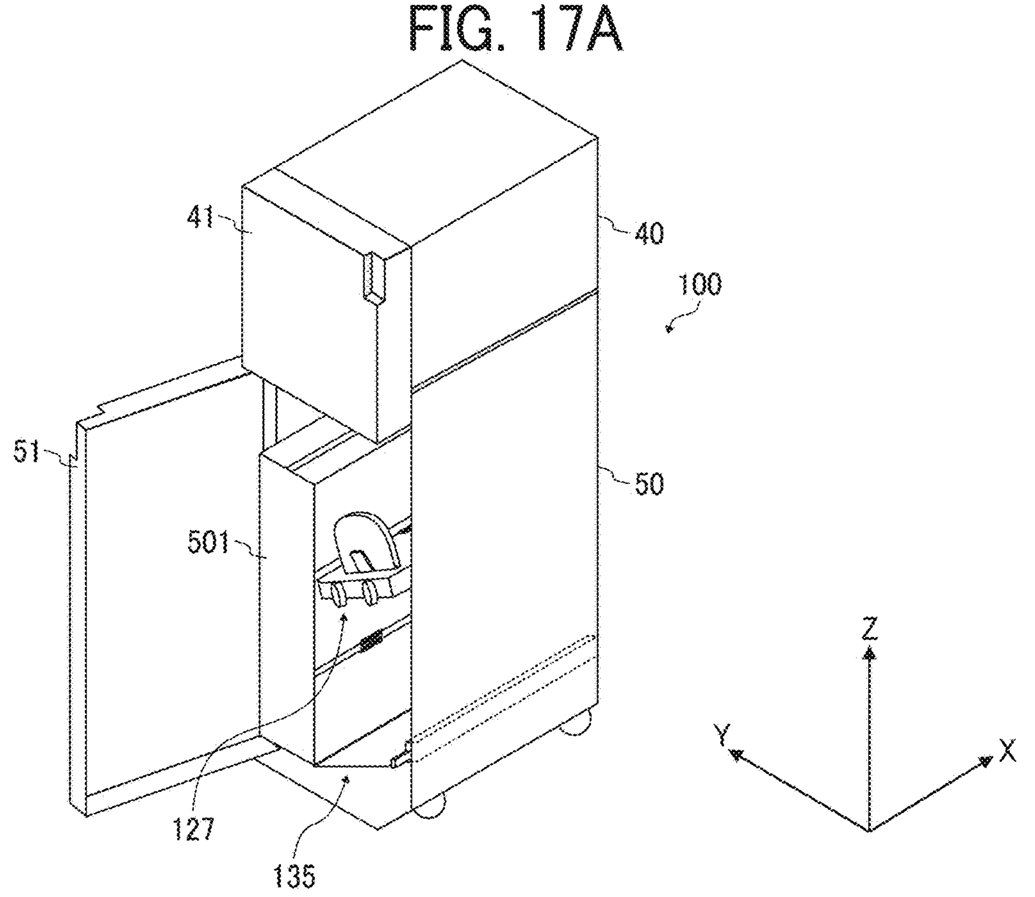
FIGS. 17A and 17B are perspective views of the enclosing-sealing processing apparatus of FIGS. 16A and 16B, illustrating states in which a front cover is open according to an embodiment of the present disclosure.
Figure 17B:
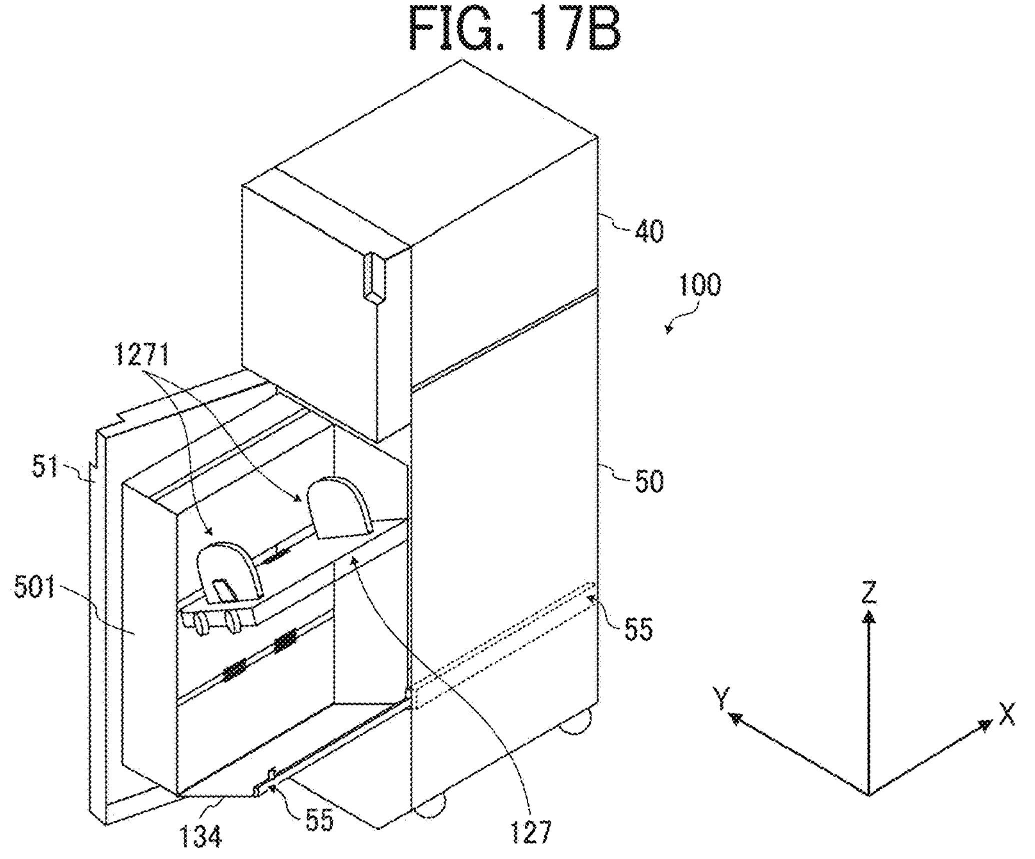

As illustrated in FIGS. 17A and 17B, the enclosing-sealing unit 50 includes an envelope loading tray 127 and an envelope ejection tray 134. A plurality of envelopes E are loaded on the envelope loading tray 127. The envelope loading tray 127 is provided with side fences 1271 serving as widthwise restricting portions, which is described later.

When envelopes E are loaded onto the envelope loading tray 127, the second cover 51 is opened as illustrated in FIG. 17A, and an enclosing-and-sealing processing unit 501 is pulled out from a housing of the enclosing-sealing unit 50 as illustrated in FIG. 17B. When the enclosing-and-sealing processing unit 501 is pulled out from the enclosing-sealing processing apparatus 100, envelopes E can be placed on the envelope loading tray 127 while avoiding the side fences 1271.

For this reason, the enclosing-sealing unit 50 includes a slide rail 55 that holds the enclosing-and-sealing processing unit 501 such that the enclosing-and-sealing processing unit 500 can be drawn out. The slide rail 55 allows the enclosing-and-sealing processing unit 501 to slide toward the front side and the back side (in the X direction) of the enclosing-sealing processing apparatus 100. The slide rail 55 includes a mechanism for holding the enclosing-and-sealing processing unit 500 at a predetermined position in the enclosing-sealing unit 50. The slide rail 55 is also provided with a stopper so that the enclosing-and-sealing processing unit 501 does not move too far to the front side (−X direction) of the enclosing-sealing processing apparatus 100 and does not fall off.

Details of Envelope Loading Tray 127

A detailed configuration of the envelope loading tray 127 is described below. The envelope loading tray 127 has a configuration of regulating the movement of the envelopes E in the width direction so that the position of the loaded envelopes E is not displaced (not laterally displaced) in the width direction of the envelopes E (a direction orthogonal to the conveyance direction of the envelopes E). The envelope loading tray 127 also has a configuration of adjusting the loaded position of the envelopes E to an appropriate position with respect to the envelope entry path 1107 while maintaining the restricted state of the envelopes E.

Figure 18A:
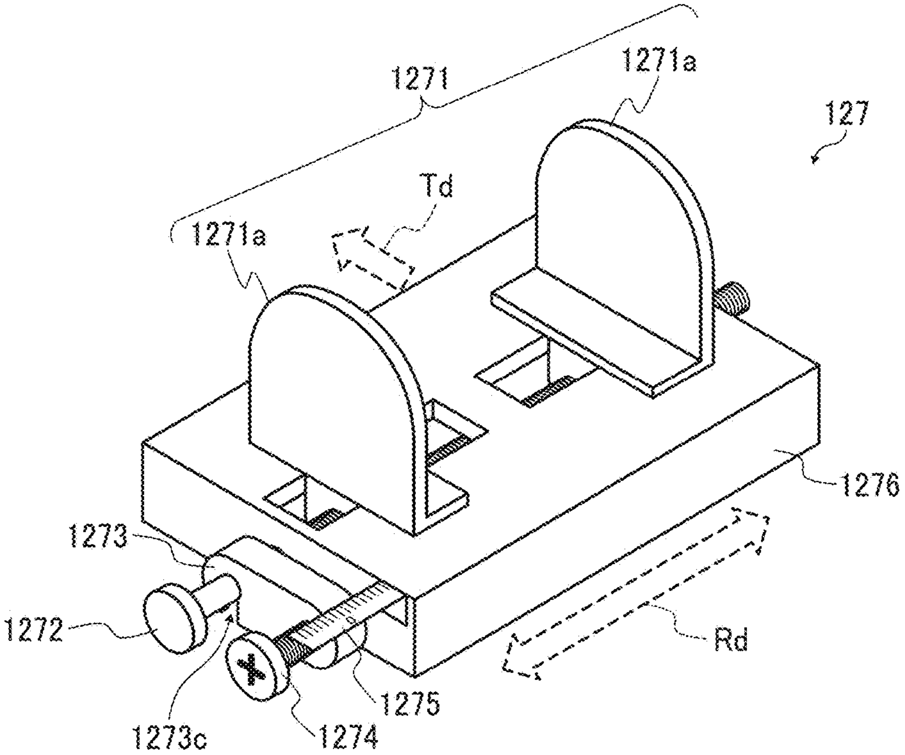
FIGS. 18A and 18B are diagrams each illustrating an envelope loading tray of an enclosing-sealing processing apparatus according to an embodiment of the present disclosure.
Figure 18B:
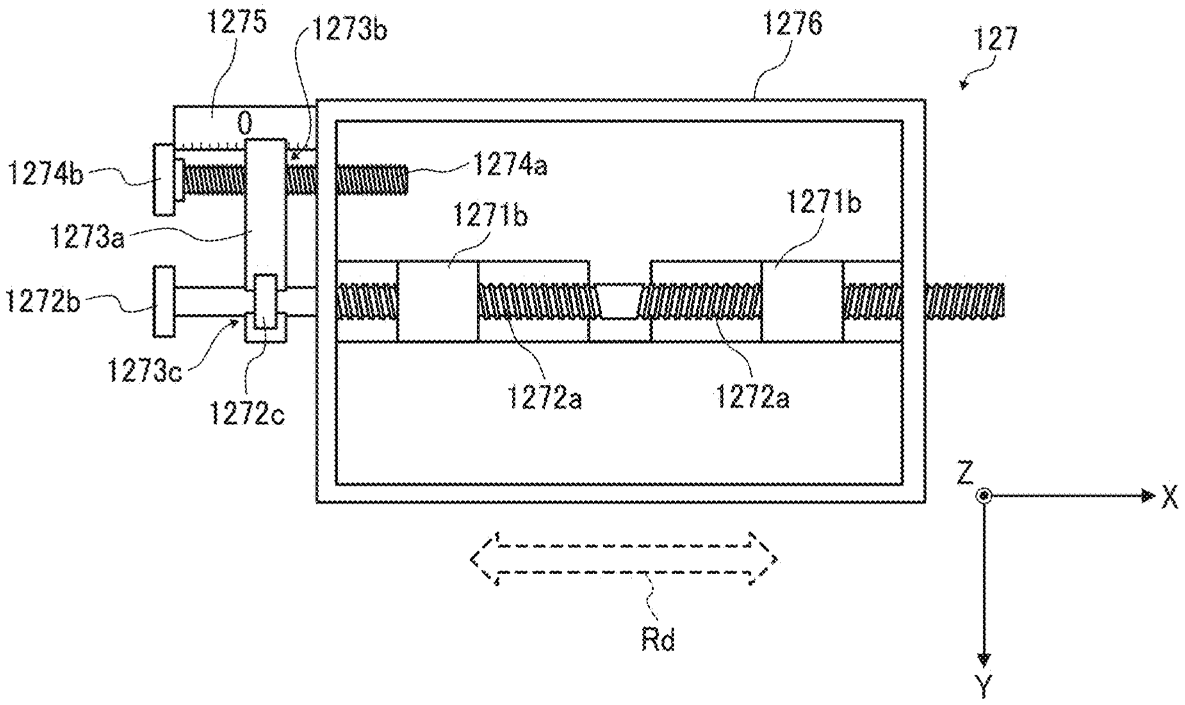

FIGS. 18A and 18B are diagrams each illustrating a configuration of the envelope loading tray 127. FIG. 18A is a perspective view of the envelope loading tray 127. FIG.

18B is a diagram illustrating a lower surface of the envelope loading tray 127 viewed in the upward direction.

As illustrated in FIGS. 18A and 18B, the envelope loading tray 127 includes a side fence 1271, a side-fence mover 1272, a tray holder 1273, a tray mover 1274, and a movable amount scale 1275.

The side fence 1271 includes a pair of partitions 1271*a* and a pair of shaft fitting portions 1271*b*. The partitions 1271*a* as a pair of partition members, which serves as an envelope-position restrictor, correspond to envelope-position restricting members for regulating the positions of both widthwise ends of the envelopes E in a state where the envelopes E are loaded on the envelope loading tray 127. Each of the shaft fitting portions 1271*b* is disposed at a lower portion of corresponding one of the pair of partitions 1271*a*, and is fitted into a side fence mover 1272 as a widthwise movable portion, which is described below, and moves corresponding one of the pair of partitions 1271*a* in a predetermined direction by the operation of the side fence mover 1272.

The side fence mover 1272 includes a second shaft 1272*a* and a second rotation knob 1272*b*. The outer peripheral surface of the second shaft 1272*a* serving as the second shaft member is divided into two regions in the axial direction of the second shaft 1272*a*. The second shaft 1272*a* has a spiral shape formed in each of the two regions of the outer peripheral surface. The spiral shapes of the two regions have spirals in opposite directions to each other. The second rotation knob 1272*b* serving as a second rotation handle is disposed at one end of the second shaft 1272*a*, and is rotated to rotate the second shaft 1272*a*.

The second shaft 1272*a* has a longitudinal length that penetrates a board 1276 corresponding to the housing of the envelop loading tray 127, and the spiral shape is not formed at a position at which the second shaft 1272*a* penetrates the board 1276 but is formed within a range that is accommodated in the inner space of the board 1276. In other words, even when the second shaft 1272*a* rotates, the second shaft 1272*a* idles relative to the board 1276, and thus the relative position of the board 1276 with respect to the second shaft 1272*a* does not change.

The two spiral portions on the second shaft 1272*a* are fitted to the shaft fitting portions 1271*b* on the lower portions of the partitions 1271*a*. When the spiral portions of the second shaft 1272*a* are rotated by rotating the second rotation knob 1272*b*, the partitions 1271*a* linearly move in opposite directions to each other in accordance with the spiral directions of the two regions. The directions in which the partitions 1271*a* move are envelope-restricting directions Rd in which the partitions 1271*a* restrict the widthwise ends of the envelopes E. The envelope-restricting directions Rd are orthogonal to the envelope conveyance direction Td of the envelope E.

Accordingly, when the second rotation knob 1272*b* is rotated, the partitions 1271*a* move in the directions opposite to each other at the same time and by the same amount, and move away from or close to the widthwise ends of the envelope E.

The tray holder 1273 includes a connector 1273*a*, a fitting portion 1273*b*, and a restriction holding portion 1273*c*. The connector 1273*a* is disposed between the second shaft 1272*a* and a first shaft 1274*a*, which is described later, and connects the second shaft 1272*a* and the first shaft 1274*a* to each other. The fitting portion 1273*b* fits into the spiral shape of the first shaft 1274*a*. The restriction holding portion 1273*c* restricts the movement of the second shaft 1272*a* in the envelope-restricting directions Rd without restricting the rotation of the second shaft 1272*a*.

The tray holder 1273 holds a state in which the relative positions of the partitions 1271*a* with respect to the board 1276 are movable with the side fence mover 1272, which serves as the envelope-position restrictor, restricting the movement of the envelope E in the width direction of the envelope E. The tray holder 1273 serving as a holder has a restriction holding portion 1273*c*. The restriction holding portion 1273*c* has a structure that allows the second shaft 1272*a* to move in the direction of rotation and restricts the movement of the second shaft 1272*a* in the axial direction.

In addition, when the first shaft 1274*a* rotates, the fitting portion 1273*b* of the tray holder 1273 relatively moves with respect to the axial direction of the first shaft 1274*a*. At this time, the second shaft 1272*a* coupled via the connector 1273*a* is moved with respect to the board 1276 by the restriction holding portion 1273*c* in synchronization with the movement of the tray holder 1273.

In other words, the tray holder 1273 restricts the movement of the envelope E in the width direction of the envelope loading tray 127, which is the same direction as the main scanning direction in the image forming apparatus and also corresponds to the width direction of the envelope E. Further, the tray holder 1273 has a structure that allows the movement of the board 1276 by the action of the tray mover 1274.

The tray mover 1274 serving as a loading mover includes the first shaft 1274*a* and a first rotation knob 1274*b*. The first shaft 1274*a* serving as a holding-position adjusting portion has a screw groove formed on the outer peripheral surface of the first shaft 1274*a*, has a portion penetrating one end of the board 1276 in the longitudinal direction, has a spiral shape in the penetrating portion, and is fitted to the board 1276. The first rotation knob 1274*b* serving as a first rotation handle is disposed at one end of the first shaft 1274*a* serving as a first shaft. When the first rotation knob 1274*b* is rotated, the first shaft 1274*a* rotates.

When the first rotation knob 1274*b* is operated to rotate the first shaft 1274*a*, the screw groove of the tray mover 1274 serving as the envelop-position adjuster rotates with respect to the board 1276 and moves the board 1276 in the envelop-restricting direction Rd. In other words, when the tray mover 1274 is rotated, the envelope loading tray 127 moves in the depth direction (X direction) of the enclosing-sealing processing apparatus 100. Thus, the position of the envelope E with respect to the envelope entry path 1107 can be adjusted in a state where the movement of the envelope E in the width direction is restricted.

The movable amount scale 1275 serves as a movable amount measuring unit that measures the movable amount of the tray holder 1273. The movable amount scale 1275 is fixed to one side face of the board 1276 constituting part of the envelope loading tray 127 and indicates an adjustment amount by which the position of the board 1276 in the envelope-restricting direction Rd is adjusted by operation of the tray mover 1274. In other words, the movable amount scale 1275 indicates the lateral registration correction amount of the envelop loading tray 127, which is an amount for adjusting the position of the envelop E in the envelop-restricting direction Rd in the state where the movement of the envelop E in the width direction is restricted by the pair of partitions 1271*a*.

The movable amount scale 1275 is provided with graduations, and uses the initial configuration position of the envelope loading tray 127 as a reference. Accordingly, when the envelope loading tray 127 is at the initial configuration position, one side face of the board 1276 is aligned with the graduation "0". The movable amount scale 1275 can measure a lateral registration correction amount, which is a distance by which the envelope loading tray 127 is moved with respect to a reference by the tray mover 1274. The lateral registration correction amount corresponds to an amount by which the tray holder 1273 is moved from the zero reference to the front side of the enclosing-sealing processing apparatus 100 (in −X direction).

Procedure of Regulating Position of Envelope E

Figure 19A:
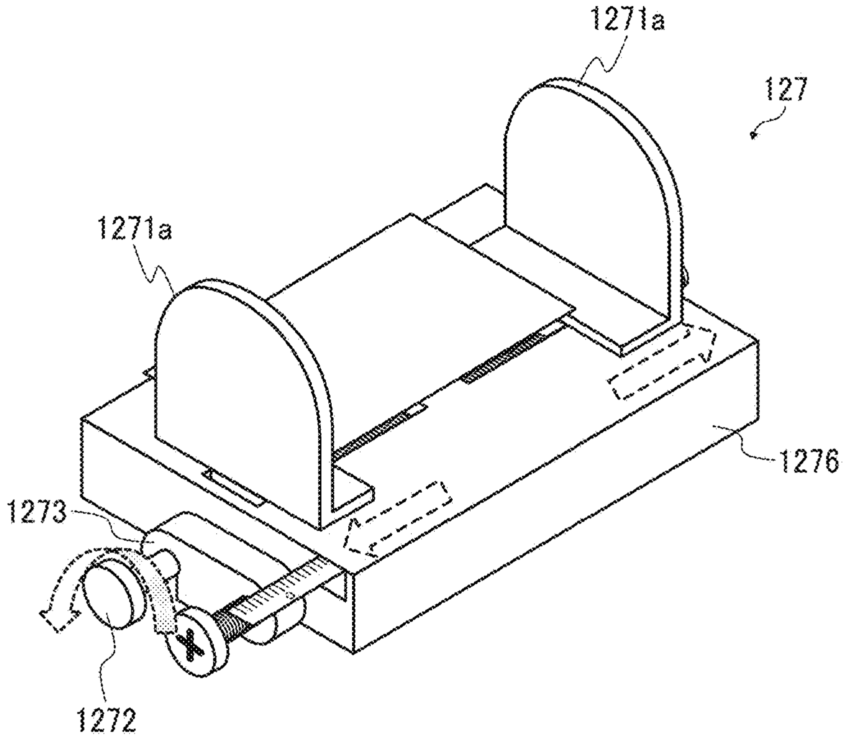
FIGS. 19A and 19B are diagrams each illustrating a step of an operation of loading an envelope onto the envelope loading tray of FIGS. 18A and 18B.
Figure 19B:
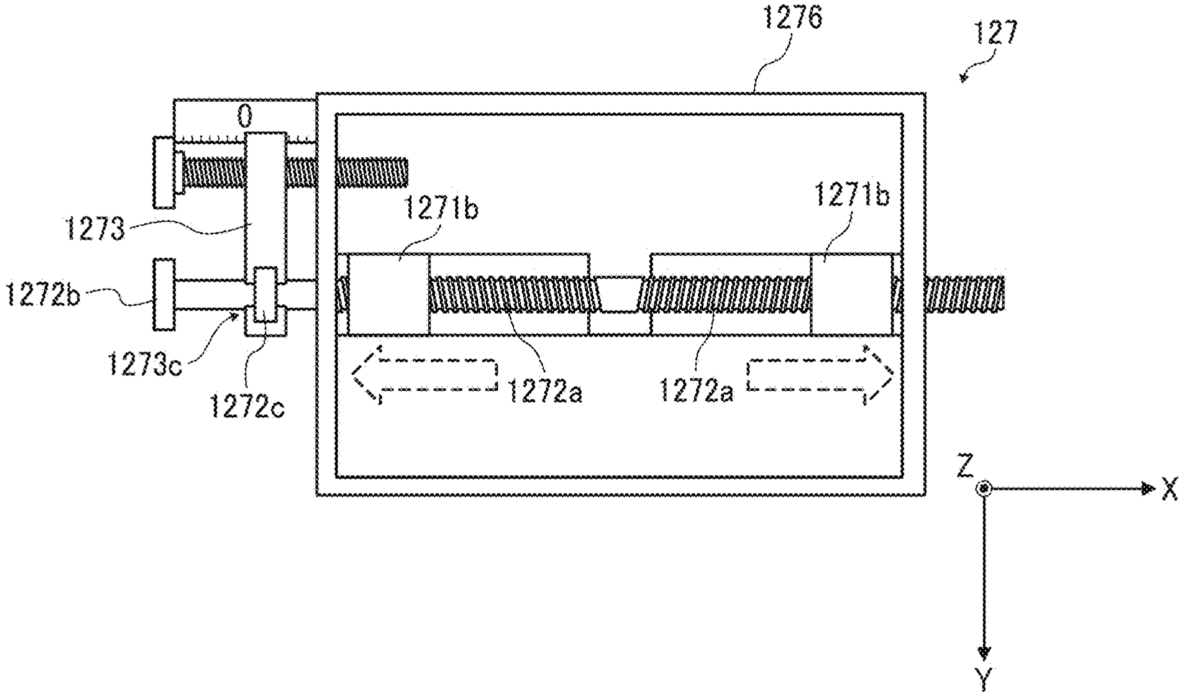

With reference to FIGS. 19A, 19B, 20A, and 20B, a description is given of a procedure of an operation for restricting the position of the envelope E by the side fence 1271. FIG. 19A is a perspective view of the envelope loading tray 127, illustrating an operation of loading the envelope E onto the envelope loading tray 127. FIG. 19B is a bottom view of the envelope loading tray 127 of FIG. 19A.

As illustrated in FIGS. 19A and 19B, when the second rotation knob 1272*b* of the side fence mover 1272 is rotated leftward with respect to the X direction, the spiral portions of the second shaft 1272*a* rotate to move the shaft fitting portions 1271*b*, which are fitted to the second shaft 1272*a*, in directions away from each other. In other words, in accordance with the spiral directions of the two regions, the pair of partitions 1271*a* move away from each other to form a gap for placing the envelopes E between the pair of partitions 1271*a*.

Figure 20A:
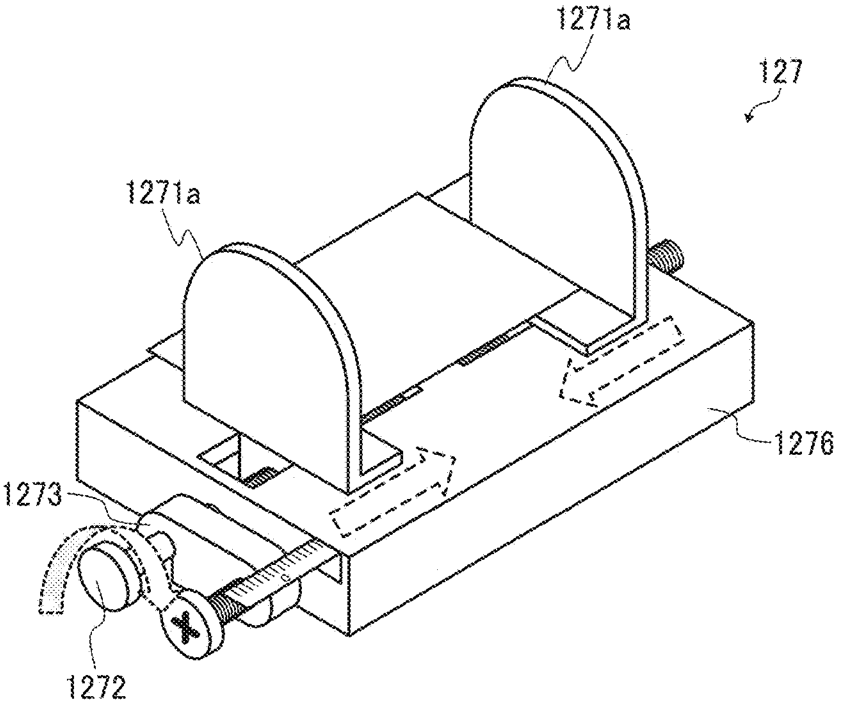
FIGS. 20A and 20B are diagrams each illustrating a step of the operation of loading an envelope onto the envelope loading tray, subsequent to the step illustrated in FIGS. 19A and 19B.
Figure 20B:
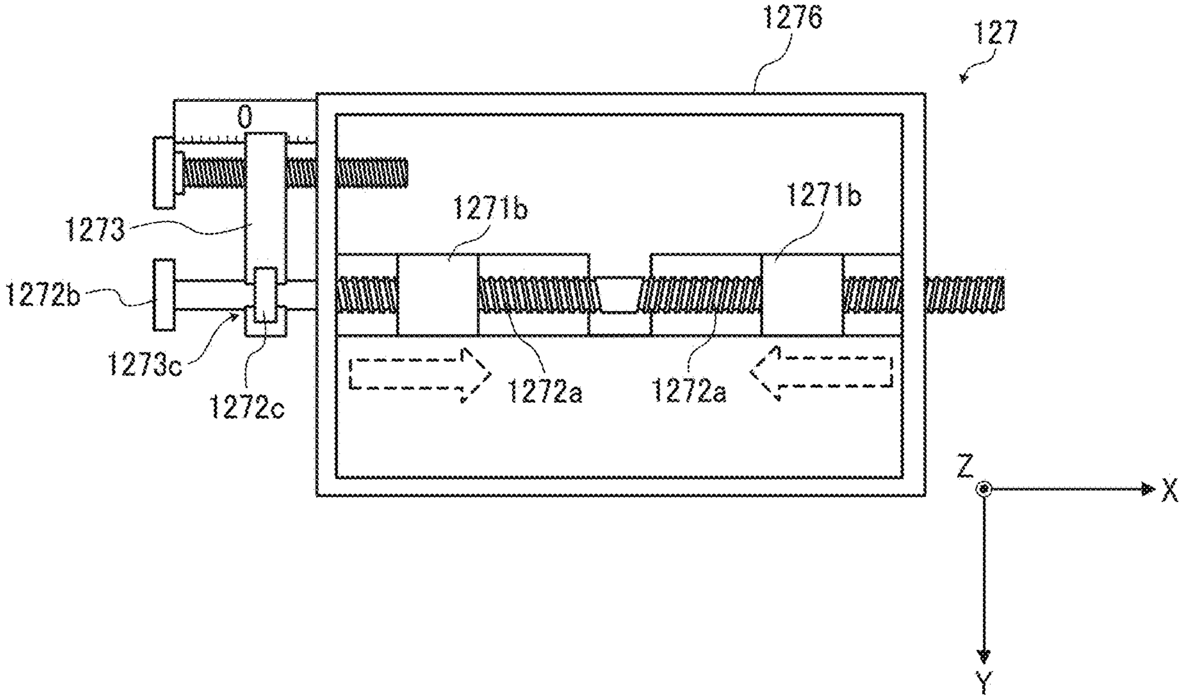

Subsequently, as illustrated in FIGS. 20A and 20B, when the second rotation knob 1272*b* is rotated in the opposite direction (rightward with respect to the X direction) to the direction of rotation of FIGS. 19A and 19B in a state where the envelop E is loaded in the gap between the pair of partitions 1271*a*, the spiral portions of the second shaft 1272*a* rotate in the opposite direction to the direction of rotation of FIGS. 19A and 19B. Then, the shaft fitting portions 1271*b*, which fitting in the spiral portions of the second shaft 1272*a*, move in directions approaching each other. In other words, in accordance with the spiral directions of the two regions, the pair of partitions 1271*a* approach each other and come into contact with the widthwise ends of the envelop E loaded between the pair of partitions 1271*a*. Thus, the position of the envelope E in the width direction is restricted.

The position of the envelope E is restricted in a direction orthogonal to the envelope conveyance direction Td. The direction corresponds to the main scanning direction in the image forming apparatus 200 disposed on the upstream side of the enclosing-sealing processing apparatus 100. In other words, the position of the envelope E in the printing system 1 is restricted in the main scanning direction.

Procedure of Adjusting Position of Envelope Loading Tray 127

Figure 21A:
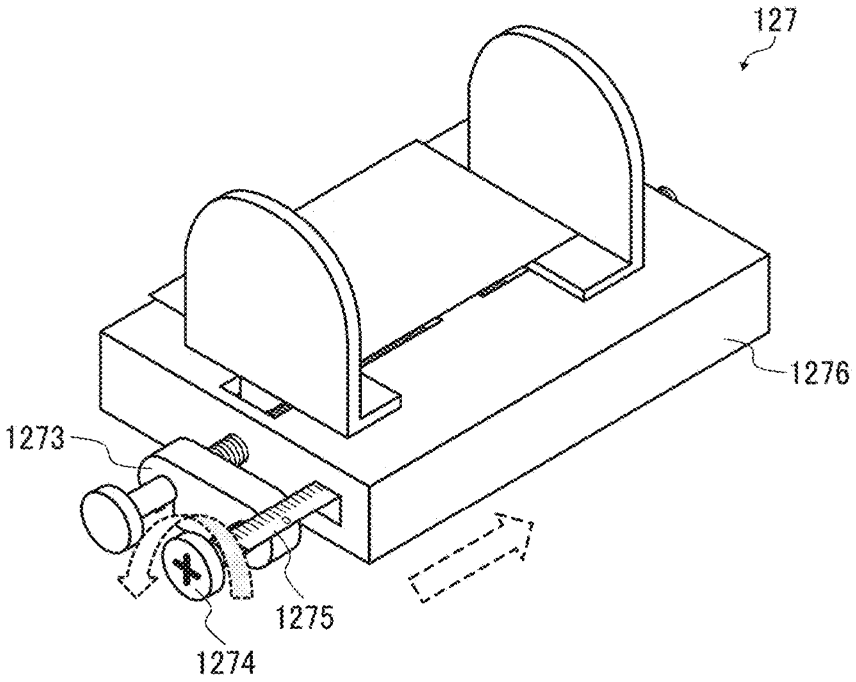
FIGS. 21A and 21B are diagrams each illustrating a step of an operation of correcting lateral registration of the envelope in the envelope loading tray, subsequent to the step of FIGS. 20A and 20B.
Figure 21B:
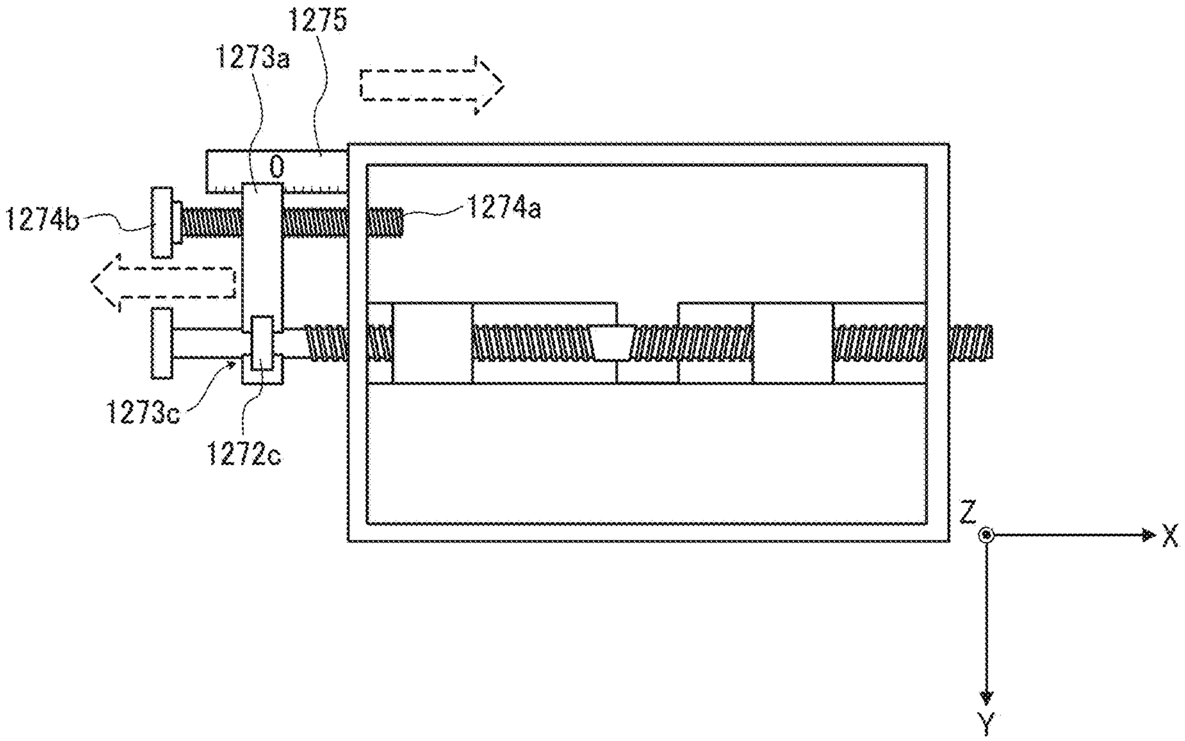

A description is given below of a procedure of an operation for adjusting the position of the envelope loading tray 127 with respect to the envelope conveyance path (the envelope entry path 1107) in a state where the envelope E whose position is restricted by the side fence 1271 with reference to FIGS. 21A, 21B, 22A, and 22B. FIG. 21A is a perspective view of the envelope loading tray 127 according to an embodiment of the present disclosure, illustrating an operation of adjusting the position of the envelope E on the envelope loading tray 127. FIG. 21B is a bottom view of the envelope loading tray 127 of FIG. 21A.

As illustrated in FIGS. 21A and 21B, when the first rotation knob 1274*b* of the tray mover 1274 is operated to rotate the first shaft 1274*a* leftward with respect to the axial direction, the envelop loading tray 127 moves in the X direction while maintaining the state illustrated in FIG. 20A (the state in which the envelope E is restricted in the width direction). In other words, the position of the envelope loading tray 127 can be adjusted to the rear side of the enclosing-sealing processing apparatus 100. Accordingly, the widthwise position of the envelope E restricted by the side fence 1271 is adjusted with respect to the envelope conveyance path. Thus, the lateral registration is corrected.

Figure 22A:
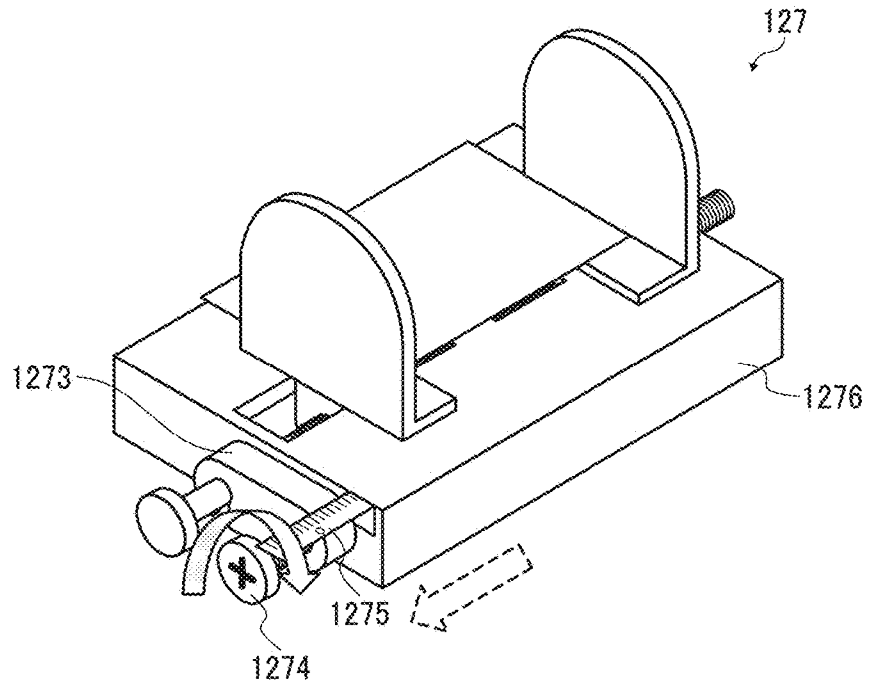
FIGS. 22A and 22B are diagrams each illustrating a step of the operation of correcting lateral registration of the envelope in the envelope loading tray, subsequent to the step of FIGS. 21A and 21B.
Figure 22B:
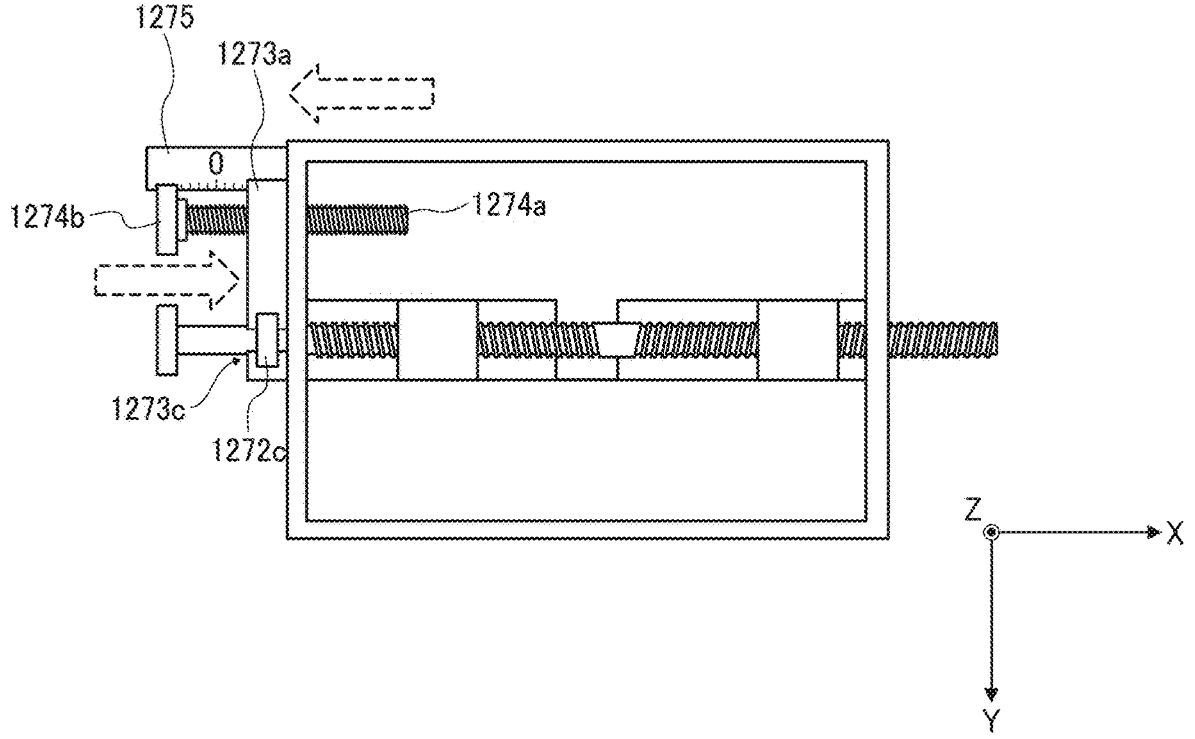

As illustrated in FIGS. 22A and 22B, when the first rotation knob 1274*b* of the tray mover 1274 is operated to rotate the first shaft 1274*a* rightward with respect to the axial direction, the envelop loading tray 127 moves in the −X direction while maintaining the state illustrated in FIG. 20A (the state in which the envelope E is restricted in the width direction). In other words, the position of the envelope loading tray 127 can be adjusted to the front side of the enclosing-sealing processing apparatus 100. Accordingly, the widthwise position of the envelope E restricted by the side fence 1271 is adjusted with respect to the envelope conveyance path. Thus, the lateral registration is corrected.

When the pitch of the spiral on the first shaft 1274*a* of the tray mover 1274 is set smaller, the adjustment range by the lateral registration correction amount can be set smaller. For example, the pitch may be equal to or less than one graduation (1 mm) formed on the movable amount scale 1275.

As described above, according to the envelope loading tray 127 of the present embodiment, when the position of the envelope E in the width direction with respect to the envelope entry path 1107 is adjusted, the tray holder 1273 is moved by operation of the tray mover 1274, thus allowing measurement of the movable amount. At the time of this measurement, the side fence 1271, the side fence mover 1272, and the envelope E also move following the movement of the board 1276 of the envelope loading tray 127. Accordingly, when the movable amount of the tray holder 1273 is adjusted to a position corresponding to a predetermined graduation of the movable amount scale 1275, the correction amount of the lateral registration with respect to the envelope conveyance direction Td of the envelope E can be adjusted.

Embodiments of the present disclosure are not limited to the above-described embodiments, and numerous additional modifications and variations are possible in light of the teachings within the technical scope of the present disclosure. It is therefore to be understood that the above-described embodiments of the present disclosure may be practiced otherwise by those skilled in the art than as specifically described herein. such modifications and alternatives are within the technical scope of the appended claims.

Aspects of the Present Disclosure

A description is given below of some aspects of the present disclosure.

First Aspect

An enclosing device includes: an envelope conveyance path to convey an envelope to an enclosing position at which an enclosure is enclosed; an envelope loader to load the envelope in a state in which the envelope is to be supplied to the envelope conveyance path; an envelope-position restrictor to restrict a loaded position of the envelope in the envelope loader; and an envelope-position adjuster to adjust a position of the envelope with respect to a conveyance direction of the envelope while maintaining a state in which the envelope-position restrictor restricts the loaded position.

Second Aspect

In the enclosing device according to the first aspect, the envelope-position adjuster includes: a holder to hold the state in which the envelope-position restrictor restricts the loaded position; and a holding-position adjusting portion to adjust a position of the holder with respect to the envelope loader.

Third Aspect

In the enclosing device according to the second aspect, the holding-position adjusting portion includes a loading mover to move, in a width direction of the envelope, the envelope loader in a state of restricting the loaded position. The loading mover changes a distance between the holder and the envelope loader.

Fourth Aspect

In the enclosing device according to the third aspect, the loading mover is a first shaft having an outer peripheral surface of a spiral shape, the first shaft fitted to the envelope loader. The first shaft has an end with a first rotation handle to rotate the spiral shape.

Fifth Aspect

In the enclosing device according to any one of the first to fourth aspects, the envelope-position restrictor includes: a pair of widthwise restricting portions to restrict positions of both ends of the envelope in the width direction; and a widthwise movable portion to move the widthwise restricting portions toward or away from the ends of the envelope in the width direction.

Sixth Aspect

In the enclosing device according to the fifth aspect, the widthwise movable portion is a second shaft having spiral shapes in two regions of an outer peripheral surface divided in an axial direction of the second shaft, the spiral shapes spiraled in relatively opposite directions. The widthwise restricting portions are a pair of partitions, and each one of the pair of partitions is fitted into corresponding one of the spiral shapes in the two regions.

Seventh Aspect

In the enclosing device according to the sixth aspect, the second shaft has an end with a second rotation handle to rotate the second shaft.

Eighth Aspect

An enclosing-sealing apparatus includes: the enclosing device according to any one of the first to seventh aspects; and a sealer to seal the envelope, in which the enclosure is enclosed, in the envelope conveyance path.

Ninth Aspect

An image forming system includes: an image forming apparatus to form an image on a sheet medium; a folding processing apparatus to fold the sheet medium on which the image is formed; and the enclosing-sealing apparatus according to the eighth aspect, to enclose the sheet medium, which is conveyed from the image forming apparatus or the folding processing apparatus, into the envelope and seal the envelope.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An enclosing device, comprising:
an envelope conveyance path to convey an envelope to an enclosing position at which an enclosure is enclosed into the envelope;
an envelope loader to load the envelope to be supplied to the envelope conveyance path;
an envelope-position restrictor to restrict a loaded position of the envelope in a width direction of the envelope in the envelope loader; and
an envelope-position adjuster to adjust a position of the envelope in the width direction of the envelope with respect to a conveyance direction of the envelope while maintaining a state in which the envelope-position restrictor restricts the loaded position of the envelope.

2. The enclosing device according to claim 1, further comprising a holder to hold the state in which the envelope-position restrictor restricts the loaded position,
wherein the envelope-position adjuster includes a holding-position adjusting portion to adjust a position of the holder with respect to the envelope loader.

3. The enclosing device according to claim 2,
wherein the holding-position adjusting portion includes a loading mover to move, in the width direction of the envelope, the envelope loader in a state of restricting the loaded position, and
wherein the loading mover is to change a distance between the holder and the envelope loader.

4. The enclosing device according to claim 3,
wherein the loading mover includes a shaft having an outer peripheral surface of a spiral shape, the shaft fitted to the envelope loader, and
wherein the shaft has an end with a rotation handle to rotate the spiral shape.

5. The enclosing device according to claim 1,
wherein the envelope-position restrictor includes:
a pair of widthwise restricting portions to restrict positions of both ends of the envelope in the width direction of the envelope; and
a widthwise movable portion to move the pair of widthwise restricting portions toward or away from the ends of the envelope in the width direction.

6. The enclosing device according to claim 5,
wherein the widthwise movable portion is a shaft having spiral shapes in two regions of an outer peripheral surface divided in an axial direction of the shaft, the spiral shapes spiraled in relatively opposite directions, and
wherein the widthwise restricting portions are a pair of partitions, and each one of the pair of partitions is fitted into corresponding one of the spiral shapes in the two regions.

7. The enclosing device according to claim 6,
wherein the shaft has an end with a rotation handle to rotate the shaft.

8. An enclosing-sealing apparatus, comprising:
the enclosing device according to claim 1; and
a sealer to seal the envelope, in which the enclosure is enclosed, in the envelope conveyance path.

9. An image forming system, comprising:
an image forming apparatus to form an image on a sheet medium;
a folding processing apparatus to fold the sheet medium on which the image is formed; and the enclosing-sealing apparatus according to claim 8, to enclose the sheet medium, which is conveyed from the image forming apparatus or the folding processing apparatus, into the envelope and seal the envelope.

10. An enclosing device, comprising:

an envelope conveyance path configured to convey an envelope to an enclosing position at which an enclosure is enclosed into the envelope;

an envelope loader configured to load the envelope to be supplied to the envelope conveyance path;

an envelope-position restrictor configured to restrict a loaded position of the envelope in a width direction of the envelope in the envelope loader; and an envelope-position adjuster configured to adjust a position of the envelope loader in the width direction of the envelope while maintaining a state in which the envelope-position restrictor restricts the loaded position of the envelope.

11. The enclosing device according to claim 10, further comprising a holder configured to hold the state in which the envelope-position restrictor restricts the loaded position, wherein the envelope-position adjuster includes a holding-position adjusting portion to adjust a position of the holder with respect to the envelope loader.

12. The enclosing device according to claim 11, wherein the holding-position adjusting portion includes a loading mover configured to move, in the width direction of the envelope, the envelope loader in a state of restricting the loaded position, and wherein the loading mover is configured to change a distance between the holder and the envelope loader.

13. The enclosing device according to claim 12, wherein the loading mover includes a shaft having an outer peripheral surface of a spiral shape, the shaft fitted to the envelope loader, and wherein the shaft has an end with a rotation handle configured to rotate the spiral shape.

14. The enclosing device according to claim 10, wherein the envelope-position restrictor includes:

a pair of widthwise restricting portions configured to restrict positions of both ends of the envelope in the width direction of the envelope; and a widthwise movable portion configured to move the pair of widthwise restricting portions toward or away from the ends of the envelope in the width direction.

15. The enclosing device according to claim 14, wherein the widthwise movable portion is a shaft having spiral shapes in two regions of an outer peripheral surface divided in an axial direction of the shaft, the spiral shapes spiraled in relatively opposite directions, and wherein the widthwise restricting portions are a pair of partitions, and each one of the pair of partitions is fitted into corresponding one of the spiral shapes in the two regions.

16. The enclosing device according to claim 15, wherein the shaft has an end with a rotation handle configured to rotate the shaft.

17. An enclosing-sealing apparatus, comprising:

the enclosing device according to claim 10; and a sealer configured to seal the envelope, in which the enclosure is enclosed, in the envelope conveyance path.

18. An image forming system, comprising:

an image forming apparatus configured to form an image on a sheet medium;

a folding processing apparatus configured to fold the sheet medium on which the image is formed; and the enclosing-sealing apparatus according to claim 17, configured to enclose the sheet medium, which is conveyed from the image forming apparatus or the folding processing apparatus, into the envelope and seal the envelope.

* * * * *